US012566125B2

(12) United States Patent
Baker et al.

(10) Patent No.: US 12,566,125 B2
(45) Date of Patent: Mar. 3, 2026

(54) SEQUENCER FOCUS QUALITY METRICS AND FOCUS TRACKING FOR PERIODICALLY PATTERNED SURFACES

(71) Applicant: ILLUMINA, INC., San Diego, CA (US)

(72) Inventors: Thomas Baker, San Diego, CA (US); Kevin Early, San Diego, CA (US); Siqi Zhang, San Diego, CA (US); Rachel Abaskharon, San Diego, CA (US); Anmiv Prabhu, San Diego, CA (US); Patrick Wen, Encinitas, CA (US)

(73) Assignee: Illumina, Inc., San Diego, CA (US)

( * ) Notice: Subject to any disclaimer, the term of this patent is extended or adjusted under 35 U.S.C. 154(b) by 710 days.

(21) Appl. No.: 17/940,591

(22) Filed: Sep. 8, 2022

(65) Prior Publication Data

US 2023/0088338 A1     Mar. 23, 2023

Related U.S. Application Data

(60) Provisional application No. 63/242,801, filed on Sep. 10, 2021.

(51) Int. Cl.
    *G01N 15/1433*     (2024.01)
    *G01N 15/10*     (2024.01)
    *G01N 15/1434*     (2024.01)

(52) U.S. Cl.
    CPC ..... *G01N 15/1433* (2024.01); *G01N 15/1012* (2013.01); *G01N 2015/1452* (2013.01)

(58) Field of Classification Search
    CPC ........... G01N 21/05; G01N 2021/6482; G01N 21/6452; G02B 7/28; G02B 21/244
    See application file for complete search history.

(56) References Cited

U.S. PATENT DOCUMENTS 6,778,263 B2     8/2004     Ortyn et al.
8,717,492 B2     5/2014     McMackin et al.
        (Continued)

FOREIGN PATENT DOCUMENTS

WO     2002039059 A1     5/2002
WO     2010111656 A2     9/2010

OTHER PUBLICATIONS

Ryuta Mizutani, et al., "A Method for Estimating Spatial Resolution of Real Image in the Fourier Domain", Journal of Microscopy, vol. 261, Issue 1, pp. 57-66, http://onlinelibrary.wiley.com/doi/10.1111/jmi.12315/abstract, 2016.
        (Continued)

*Primary Examiner* — Akwasi M Sarpong
*Assistant Examiner* — Michael L Burleson
(74) *Attorney, Agent, or Firm* — Fletcher Yoder, P.C.

(57)     ABSTRACT

Generation and use of a focus quality metric that is intensity independent is described. In one example, the focus quality metric is generated by acquiring an image, such as an image of a patterned surface of a flow cell, and processing all or part (e.g., a sub-region or sub-image) to generate a Fourier transform of the respective image data. By way of example, in one embodiment a discrete Fourier transform may be applied to a sub-region of an image of a patterned flow cell surface. A focus quality metric that is intensity independent may be derived from the Fourier transform of the image data.

23 Claims, 25 Drawing Sheets

(56)  References Cited

U.S. PATENT DOCUMENTS

| | | | |
|---|---|---|---|
| 2004/0136581 A1 | 7/2004 | Ellis et al. | |
| 2006/0098861 A1* | 5/2006 | See | G01B 11/08 |
| | | | 382/145 |
| 2010/0246977 A1* | 9/2010 | Fu | G06T 7/0012 |
| | | | 382/218 |
| 2011/0229977 A1* | 9/2011 | Nishio | G01N 33/54388 |
| | | | 422/400 |
| 2021/0329154 A1* | 10/2021 | Holt | G06T 5/73 |

OTHER PUBLICATIONS

Saiga et al., "Method for Estimating Modulation Transfer Function From Sample Images", Micron, vol. 105, pp. 64-69, https://doi.org/10.1016/j.micron.2017.11.009, 2018.

International Search Report and Written Opinion for PCT/US2022/042986, mailed Dec. 23, 2022, 15 pages.

Dana Ballard et al, "Chapter 2: Image Formation", In: "Computer Vision", Prentice Hall, Englewood Cliffs, NJ, XP093009083, ISBN: 978-0-13-165316-0 Retrieved from the Internet: URL:http://engr.case.edu/merat_francis/eecs490f06/References/BallardBrown/Ballard%20Ch2.pdf, Jan. 1, 1982, 46 pages.

Anonymous: "tclSadie Filter Menu", XP093008895, Retrieved from the Internet: URL:https://uweb.engr.arizona.edu/~dial/tclsadie/pages/070filtermenu.html, Aug. 31, 2000, 16 pages.

Mark-Anthony Bray et al, "NLM Citation: Bray MA, Carpenter A; Imaging Platform, Broad Institute of MIT and Harvard. Advanced Assay Development Guidelines for Image-Based High Content Screening and Analysis Advanced Assay Development Guidelines for Image-Based High Content Screening and Analysis" In: "Assay Guidance Manual", XP093008911, Retrieved from the Internet: URL:https://www.ncbi.nlm.nih.gov/books/NBK126174/pdf/Bookshelf_NBK126174.pdf, Jul. 8, 2017, 28 pages.

Anonymous: "Point spread function", Jun. 30, 2021, XP093008844, Retrieved from the Internet: URL:https://argolight.com/files/Daybook3/Analysis/documentation_v1.8.3/documentation_point_spread_function.pdf, Jun. 30, 2021, 17 pages.

* cited by examiner

470A

482

ACQUIRE IMAGE                                        450

SELECT ONE OR MORE
ROWS OF PIXELS                                       600

PERFORM FFT ON ONE
OR MORE ROWS OF PIXELS                               602

CALCULATE POWER
SPECTRUM FOR A GIVEN ROW                             608

CALCULATE AVERAGE IN K-
SPACE OF POWER SPECTRUM                              612

GENERATE
LEAST SQUARES FIT OF
THE INTEGRATED POWER                                 616
VERSUS K-SPACE PLOT

DETERMINE
SLOPE OF THE LINEAR FIT                              620

SEQUENCER FOCUS QUALITY METRICS AND FOCUS TRACKING FOR PERIODICALLY PATTERNED SURFACES

CROSS-REFERENCE TO RELATED APPLICATIONS

This application claims priority to and the benefit of U.S. Provisional Application No. 63/242,801, entitled "SEQUENCER FOCUS QUALITY METRICS AND FOCUS TRACKING FOR PERIODICALLY PATTERNED SURFACES", filed on Sep. 10, 2021, the disclosure of which is hereby incorporated by reference in all its entirety for all purposes.

BACKGROUND

The present approach relates generally to image-based approaches for evaluating patterned surfaces, including patterned surface on substrates used to sequence or otherwise process nucleic acid sequences. More particularly, the approach relates to the assessment of focus quality with respect to scanning such patterned surfaces.

In a nucleic acid sequencing context, a sequencing device, such as a flow cell may include a number of individual sites (e.g., sample wells or nanowells) at locations on a surface. Such sites may contain chemical groups or biological molecules, which can be identical or different among the many sites, and can interact with other materials of interest, such as a biological sample. Sites can be located and/or analyzed by taking an image of the substrate surface, such as by planar imaging or by line scanning. The image data may be processed to locate and identify at least a portion of the sites and/or to obtain qualitative or quantitative measurements related to samples being analyzed. In such a context, where a chemical or biological interaction occurs at a particular site, the interaction may be detected at the site and correlated with the location and identity of the site, as well as the particular group or molecule present at the site.

Sites are frequently arranged in a regular geometrical pattern in which elements of the pattern repeat, such as a checkerboard or hexagonal grid, to optimize the number of sites available on the substrate surface and to facilitate the location of sites by automated instruments. The location of individual sites on a surface can be determined and/or corrected using various registration methods. By way of example, local registration techniques may utilize a rigid registration fiducial, such as a bullseye pattern present at various known locations within an image to allow cross-correlation with a known template. In-plane shifts or offsets may be determined as a result of this cross-correlation and the template locations and/or image data may be adjusted or corrected based on these offsets.

With the preceding context in mind, it may be appreciated that the focus quality associated with the imaging processes employed in reading sites on a sequencing device, such as a flow cell, is of importance, both for the registration processes performed to localize sites for data readout as well as for the data acquisition steps themselves. Focus quality may therefore be quantified for monitoring or implementing several steps in a given sequencing operation including, but not limited to, registration of the sample sites on a given surface (e.g., flow cell registration), focus model generation, focal plane mapping, and focus tracking over the course of sequencing runs.

Current approaches to measuring or otherwise assessing focus quality may be based on the use of a Brenner gradient or function to generate a focus score (i.e., a Brenner score) that can be used to part of an auto-focus process. However, such Brenner scores are intrinsically intensity dependent. Correspondingly, focus techniques based on Brenner scores suffer from robustness issues due to this intensity dependence. For example, in a nucleic acid sequencing context, a focus metric based on Brenner scores may not be robust over time or between sequencing systems due to the intensity of fluorophores across flow cell surfaces being non-uniform or changing over time (e.g., spatial and/or temporal non-uniformities). Focus assessment based on the Brenner gradient may therefore mischaracterize variations in intensity as variations or differences in focus. As a result, it is not robust to compare Brenner scores across instruments (e.g., sequencers) and/or flow cells, or even within image tiles acquired of a flow cell.

SUMMARY

The presently described techniques provide for the generation and use of a focus quality metric that is intensity independent. In one context, the focus quality metric is generated by acquiring an image, such as an image of a patterned surface of a flow cell, and processing all or part (e.g., a sub-region or sub-image) to generate a Fourier transform of the respective image data. By way of example, in one embodiment a discrete Fourier transform may be applied to a sub-region of an image of a patterned flow cell surface. Mean (or median) radial intensities may be calculated for the resulting Fourier transform and subsequently used to determine a power spectrum for the Fourier transform and underlying image data. Various examples herein are presented in the context of a two-dimensional (2D) Fourier transform and such examples may make reference to radii, radial intensities, radial average, and so forth in the context of the corresponding 2D Fourier transform. However, it should be understood that such references to radii or values derived for the respective radii may be considered special cases in these 2D contexts and that such radius-based terminology may be encompassed in other examples, and in a broader context in general, in relation to k-space (i.e., Fourier or frequency space) and k-values within k-space. Thus, as used herein references to radius, radial average, radial intensity, and so forth may more broadly be understood to correspond to their generalized counterparts in k-space and such k-space terminology may be used as appropriate in non-2D (e.g., one-dimensional (1D)) Fourier transform examples herein as appropriate.

A piece-wise function may be fitted to the power spectrum and one or more parameters determined for the fitted piece-wise function. Such parameters may include, but are not limited to, a radial slope, a corner frequency, a noise floor, and so forth. In one embodiment, the radial slope constitutes a focus quality metric for the imaged sub-region from which the Fourier transform was derived. The radial slope, and the corresponding focus quality metric, is intensity independent, and thus provides a consistent measure of focus quality regardless of intensity variations over the course of a sequencing run and/or between sequencing imagers.

Of significance, certain of the presently described approaches for generating a focus quality metric do not assume a Gaussian distribution profile for a point spread function, which may be assumed in other, conventional approaches. Indeed, a Lorentzian distribution profile, in certain embodiments, may better describe the point spread function. Because a Gaussian profile is not assumed, the presently disclosed focus quality quantification techniques are more flexible in their application than other approaches that rely on such an assumption.

In practice, a focus quality metric generated in accordance with the presently described techniques may be generated at the beginning of a sequencing run and used to parameterize a focus model which is subsequently used throughout the sequencing run to monitor and correct focus of the imager with respect to the patterned surface of the flow cell. By way of example, as part of the initial focus model generation, a real-time focus monitoring system, such as an infrared (IR) based focus measurement system may be calibrated based on the focus model. The calibrated IR focus measurement systems may subsequently be used during sequencing to monitor and correct focus in real-time. In some embodiments a focus quality metric as described herein is calculated only at the beginning of a sequencing run for focus model generation. In other embodiments the focus quality metric as described herein is calculated at intervals (e.g., every 10, 20, 30, or 40 cycles) to update the focus model and re-calibrate the real-time focus measurement system.

In some systems, image acquisition may be multi-channel such that images at different frequencies (e.g., red, blue, green, and so forth) are obtained for each imaged region. In such systems, the focus quality metric as described herein may be calculated for each channel with respect to the imaged region. A focal plane or height may then be determined by selecting a representative focus height (e.g., an intermediate focus height) that provides suitable focus for each respective color channel.

With the preceding in mind, in one embodiment a method is provided for calculating a focus quality metric. In accordance with this method, an image of a flow cell comprising a plurality of sample wells is acquired or accessed. A Fourier transform is calculated of some or all of the image. An optical point spread function (PSF) associated with the image does not have a Gaussian distribution profile. A power spectrum is calculated based on the Fourier transform. A slope is calculated of a linear segment fitted to a portion of the power spectrum. The slope corresponds to the focus quality metric.

In a further implementation, a sequencing instrument is provided. In accordance with this implementation, the sequencing instrument comprises: a sample stage configured to support a sample container; an objective lens, a photo-detector, and a light source configured to operate in combination to image the sample container when present on the sample stage; a focus component configured to control positioning of the objective lens relative to the sample container when present on the sample stage; and a controller. The controller is configured to perform operations comprising: for each image in a stack of images acquired of a sample surface at different z-heights, calculating a respective Fourier transform for a sub-region of the respective image; for each Fourier transform, calculating a respective slope of a linear segment fitted to a portion of a respective power spectrum calculated from the Fourier transform, wherein the slope corresponds to a focus quality metric; parameterizing a focus model based upon the focus quality metrics; and controlling operation of the focus component during a sequencing operation based on the focus model.

In an additional embodiment a method is provided for calculating a focus quality metric. In accordance with this method, an image of a flow cell comprising a plurality of sample wells is acquired or accessed. A one-dimensional Fourier transform of one or more rows of pixels within the image is calculated. A power spectrum is determined based on the one-dimensional Fourier transform of each respective row of pixels. A slope of a linear segment fitted to a portion of the power spectrum is determined. Wherein the slope corresponds to the focus quality metric. A focus model is parameterized or calibrated based on at least the focus quality metric or a score derived from the focus quality metric. The relative position of an objective lens and a sample stage on which the flow cell is positioned is adjusted based upon the focus model.

In a further embodiment, a sequencing instrument is provided. In accordance with this implementation, the sequencing instrument comprises: a sample stage configured to support a flow cell; an objective lens, a photodetector, and a light source configured to operate in combination to image the flow cell when present on the sample stage; a focus component configured to control positioning of the objective lens relative to the flow cell when present on the sample stage; and a controller. The controller is configured to perform operations comprising: for each image in a stack of images acquired of a sample surface at different z-heights, determining a respective one-dimensional Fourier transform for a row of pixels within the respective image; for each one-dimensional Fourier transform, determining a respective slope of a linear segment fitted to a portion of a respective power spectrum calculated from the one-dimensional Fourier transform, wherein the slope corresponds to a focus quality metric; parameterizing a focus model based upon the focus quality metrics; and controlling operation of the focus component during a sequencing operation based on the focus model.

BRIEF DESCRIPTION OF THE DRAWINGS

These and other features, aspects, and advantages of the present invention will become better understood when the following detailed description is read with reference to the accompanying drawings, in which like characters represent like parts throughout the drawings, wherein.

DETAILED DESCRIPTION

Figure 1:
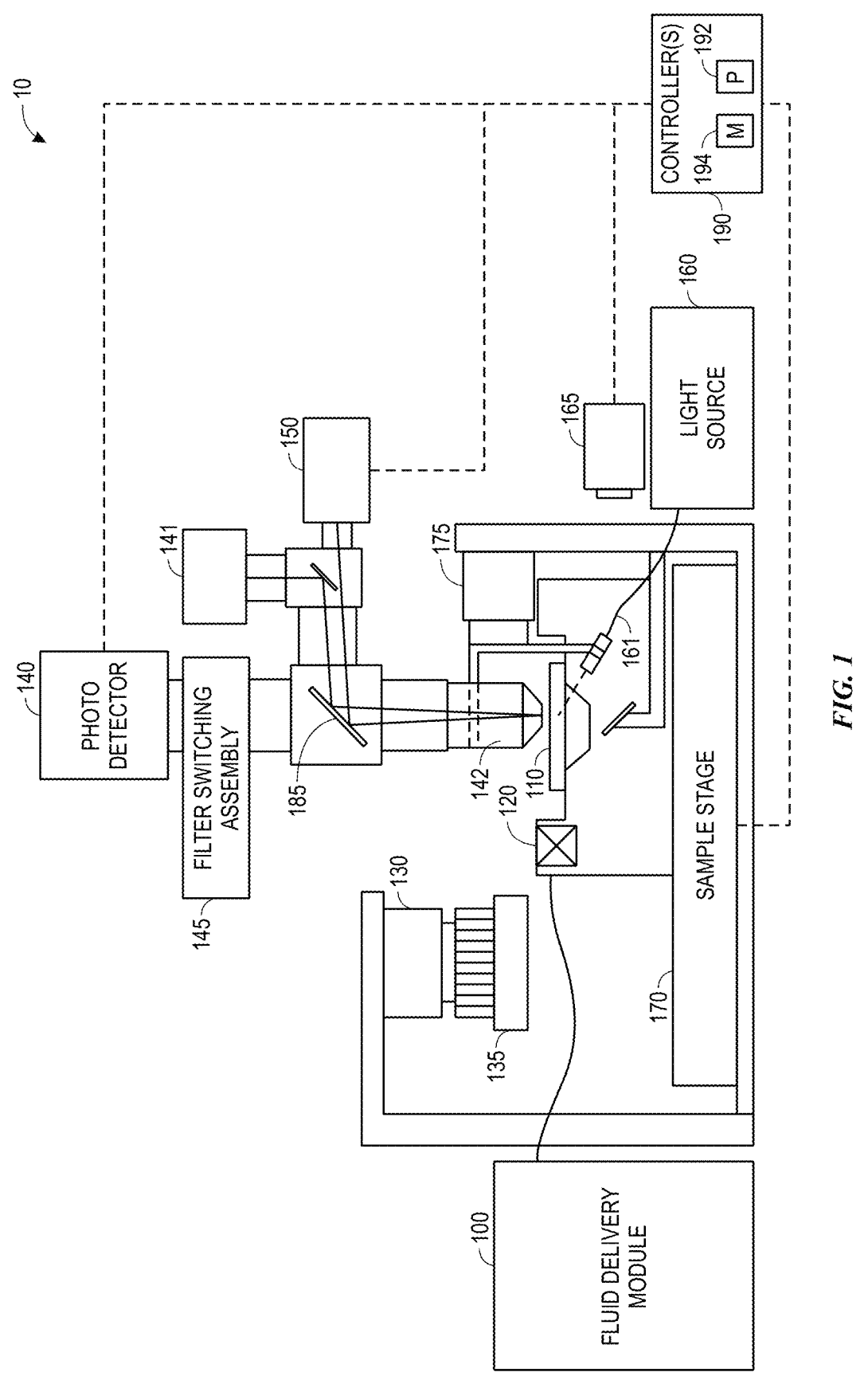
FIG. 1 illustrates a high-level overview of one example of an image scanning system, in accordance with the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

This disclosure provides for the use of Fourier transforms (e.g., discrete Fourier transforms (DFTs)) in the generation of focus quality metrics and, additionally, examples of uses for such focus quality metrics, such as to generate or otherwise parameterize a focus model used over the course of a sequencing or scanning operation to provide real-time focus monitoring or correction. In certain implementations a regularly patterned surface (e.g., a surface having a periodic or otherwise repeating pattern of sites, such as sample wells) is imaged and regions or sub-regions of the image are separately assessed for focus quality, such as by calculating a focus quality metric as described herein for each region or sub-region of interest. Focus quality metrics generated in accordance with this approach are intensity independent, and therefore robust with respect to fluctuations in intensity across the patterned surface, between runs, or between devices. As a result, the focus quality metrics described can be used to quantify and compare focus quality even on images exhibiting photobleaching or other intensity dynamics that lead to variations in intensity between devices, sample, processes, runs, and so forth.

To provide further context for terminology and concepts discussed below, it may be noted that as used herein, a "flow cell" may be understood to be a sample holding and/or processing structure or device. Such devices comprise sites or wells (i.e., sample sites or binding sites) at which analytes may be located for processing and analysis. As discussed herein, some or all of the sites may be disposed in a repeating or periodic pattern on one or more surfaces of the flow cell structure.

In addition, with respect to the concept of "focus" and its use and relevance to imaging operations, this concept may be relevant to, but is not limited to: (1) real-time autofocus of focusing an area that is being imaged in real-time; (2) look ahead predictive focusing by analyzing the next area to be imaged; and/or (3) feedforward focus by using the information of a prior scan from a previous scan cycle of the same region into the current scan, some or all of which are discussed in U.S. Pat. No. 8,422,031 (titled "FOCUSING METHODS AND OPTICAL SYSTEMS AND ASSEMBLIES USING THE SAME", filed on Nov. 16, 2010, and issued on Apr. 16, 2013), U.S. Pat. No. 11,054,624 (titled "PREDICTIVE FOCUS TRACKING APPARATUS AND METHODS", filed on Dec. 22, 2017, and issued on Jul. 6, 2021), and U.S. Pat. No. 10,834,308 (titled "REAL TIME CONTROLLER SWITCHING", filed on Jan. 10, 2019, and issued on Nov. 10, 2020), all of which are incorporated by reference herein in their entirety and for all purposes.

Further, as discussed herein, in a nucleic acid sequencing technique, oligomeric or polymeric chains of nucleic acids, which may be spatially separated and localized on a substrate, such as a patterned surface of a flow cell, may be subjected to several cycles of biochemical processing and imaging. Such patterned surfaces may comprise DNA or RNA probes specific to nucleotide sequences present in plants, animals (e.g., humans), and other organisms. In some applications individual DNA or RNA probes can be attached at individual features (e.g., sample wells or sites) of a surface of a patterned flow cell. A test sample, such as from a known or unknown person or organism, can be exposed to the sites, such that target nucleic acids (e.g., gene fragments, mRNA, or amplicons thereof) hybridize to complementary probes at respective sites in the pattern of sites. The probes can be labeled in a target specific process (e.g., due to labels present on the target nucleic acids or due to enzymatic labeling of the probes or targets that are present in hybridized form at the features). The patterned surface can then be examined, such as by scanning specific frequencies (e.g., one, two, three, or four frequencies) of light over the features to identify which target nucleic acids are present in the sample. In practice, multiple (e.g., two) different images may be obtained in a given cycle and each feature will be detected in the combined images. Sequencing includes multiple cycles, and image data from successive cycles is used to determine the sequence of nucleotides at each site based on the sequence of labels detected at the respective site. As discussed herein, poor focus of the images can adversely affect sequence analysis.

With respect to the size of features, such as reaction or sample binding sites (e.g., sample wells or nanowells) on a patterned surface, the size of such features can be selected to suit a desired application. In some examples, a feature of a patterned surface can have a size that accommodates only a single nucleic acid molecule. A surface having a plurality of features in this size range is useful for constructing a pattern of molecules for detection at single molecule resolution. Features in this size range are also useful in patterned surfaces having features that each contain a colony of nucleic acid molecules. Thus, the features of a patterned surface can each have an area that is no larger than about 1 $mm^2$, no larger than about 500 $\mu m^2$, no larger than about 100 $\mu m^2$, no larger than about 10 $\mu m^2$, no larger than about 1 $\mu m^2$, no larger than about 500 $nm^2$, no larger than about 100 $nm^2$, no larger than about 10 $nm^2$, no larger than about 5 $nm^2$, or no larger than about 1 $nm^2$. Alternatively or additionally, the features of a patterned surface will be no smaller than about 1 $mm^2$, no smaller than about 500 $\mu m^2$, no smaller than about 100 $\mu m^2$, no smaller than about 10 $\mu m^2$, no smaller than about 1 $\mu m^2$, no smaller than about 500 $nm^2$, no smaller than about 100 $nm^2$, no smaller than about 10 $nm^2$, no smaller than about 5 $nm^2$, or no smaller than about 1 $nm^2$. Indeed, a feature can have a size that is in a range between an upper and lower limit selected from those exemplified above. Although several size ranges for features of a surface have been exemplified with respect to nucleic acids and on the scale of nucleic acids, it will be understood that features in these size ranges can be used for applications that do not include nucleic acids. It will be further understood that the size of the features need not necessarily be confined to a scale used for nucleic acid applications.

For examples that include an object (e.g., a flow cell surface) having a plurality of features, the features (e.g., sample sites or wells) can be discrete, being separated with spaces between each other. A patterned surface useful in the present context can have features that are separated by edge-to-edge distance of at most about 100 $\mu m$, about 50 $\mu m$, about 10 $\mu m$, about 5 $\mu m$, about 1 $\mu m$, about 0.5 $\mu m$, or less. Alternatively or additionally, a patterned surface can have features that are separated by an edge-to-edge distance of at least about 0.5 $\mu m$, about 1 $\mu m$, about 5 $\mu m$, about 10 $\mu m$, about 50 $\mu m$, about 100 $\mu m$, or more. These ranges can apply to the average edge to edge spacing for features, as well as to the minimum or maximum spacing.

The size of the features and/or pitch of the features can vary such that the features on a patterned surface can have a desired density. For example, the average feature pitch in a regular pattern can be at most about 100 $\mu m$, about 50 $\mu m$, about 10 $\mu m$, about 5 $\mu m$, about 1 $\mu m$, or about 0.5 $\mu m$ or less. Alternatively or additionally, the average feature pitch in a regular pattern can be at least about 0.5 $\mu m$, about 1 $\mu m$, about 5 $\mu m$, about 10 $\mu m$, about 50 $\mu m$, or about 100 $\mu m$ or more. These ranges can apply to the maximum or minimum pitch for a regular pattern as well. For example, the maximum feature pitch for a regular pattern can be at most about 100 $\mu m$, about 50 $\mu m$, about 10 $\mu m$, about 5 $\mu m$, about 1 $\mu m$, or about 0.5 $\mu m$ or less; and/or the minimum feature pitch in a regular pattern can be at least about 0.5 $\mu m$, about 1 $\mu m$, about 5 $\mu m$, about 10 $\mu m$, about 50 $\mu m$, or about 100 $\mu m$ or more.

The density of features on a patterned surface can also be understood in terms of the number of features present per unit area. For example, the average density of features on a patterned surface can be at least about $1 \times 10^3$ features/$mm^2$, about $1 \times 10^4$ features/$mm^2$, about $1 \times 10^5$ features/$mm^2$ about $1 \times 10^6$ feature s/$mm^2$, about $1 \times 10^7$ feature s/$mm^2$, ab out $1 \times 10^8$ features/$mm^2$, or about $1 \times 10^9$ features/$mm^2$ or higher. Alternatively or additionally, the average density of features on a patterned surface can be at most about $1 \times 10^9$ features/$mm^2$, about $1 \times 10^8$ features/$mm^2$, about $1 \times 10^7$ features/$mm^2$, about $1 \times 10^6$ features/$mm^2$, about $1 \times 10^5$ features/$mm^2$, about $1 \times 10^4$ features/$mm^2$, or about $1 \times 10^3$ features/$mm^2$ or less.

The features provided on a patterned surface can have any of a variety of shapes, cross-sections, and layouts. For example, when observed in a two-dimensional plane, such as on a surface, the features can have a perimeter that is rounded, circular, oval, rectangular, square, symmetric, asymmetric, triangular, polygonal, or the like. The features can be arranged in a regular repeating pattern including, for example, a hexagonal or rectilinear pattern. A pattern can be selected to achieve a desired level of packing. For example, round features are optimally packed in a hexagonal arrangement. Other packing arrangements can also be used for round features and vice versa.

In general, a patterned surface might be characterized in terms of the number of features that are present in a subset that forms the smallest geometric unit of the pattern. The subset can include, for example, at least 2, 3, 4, 5, 6, 10 or more features. Depending upon the size and density of the features, the geometric unit can occupy an area of less than about 1 $mm^2$, about 500 $nm^2$, about 100 $nm^2$, about 50 $nm^2$, about 10 $nm^2$, about 1 $nm^2$, about 500 $nm^2$, about 100 $nm^2$, about 50 $nm^2$, or about 10 $nm^2$ or less. Alternatively or additionally, the geometric unit can occupy an area of greater than about 10 $nm^2$, about 50 $nm^2$, about 100 $nm^2$, about 500 $nm^2$, about 1 $nm^2$, about 10 $nm^2$, about 50 $nm^2$, about 100 $nm^2$, about 500 $nm^2$, or about 1 $mm^2$ or more. Characteristics of the features in a geometric unit, such as shape, size, pitch and the like, can be selected from those set forth herein more generally with regard to features provided on a patterned surface.

A surface having a regular pattern of features can be ordered with respect to the relative locations of the features but random with respect to one or more other characteristic of each feature. For example, in the case of a nucleic acid sequencing surface, the nucleic acid features can be ordered with respect to their relative locations but random with respect to one's knowledge of the sequence for the nucleic acid species present at any feature. As a more specific example, nucleic acid sequencing surfaces formed by seeding a repeating pattern of features with template nucleic acids and amplifying the template at each feature to form copies of the template at the feature (e.g., via cluster amplification or bridge amplification) will have a regular pattern of nucleic acid features but will be random with regard to the distribution of sequences of the nucleic acids across the pattern. Thus, detection of the presence of nucleic acid material on the surface can yield a repeating pattern of features, whereas sequence specific detection can yield non-repeating distribution of signals across the surface.

As may be appreciated, the description of patterns, order, randomness and so forth provided herein not only pertains to features on objects (e.g., a solid substrate having such features, such as features on solid-supports or surface), but also to image data, or images generated from such image data, that includes or depicts such an object having features as described herein. As such, patterns, order, randomness and so forth can be present in any of a variety of formats that are used to store, manipulate or communicate image data including, but not limited to, a computer readable medium or computer component such as a graphical user interface or other output device.

As used herein, the term "fiducial" is intended to mean a distinguishable region (e.g., point or area) of reference in or on an object (such as a support or substrate with sites for molecular materials to be analyzed, such as a flow cell surface) as well as in image data acquired of the object. The fiducial can be, for example, a mark, an object, shape, edge, area, irregularity, channel, pit, post, or, as in many cases, a collection of features at known locations, geometry, and/or configuration that can be used as a reference. The fiducial can be detected in an image of the object or in another data set derived from detecting (e.g., imaging) the object.

Fiducials are included on or in the patterned surfaces contemplated in the present disclosure as well as in image data of the sites and molecules to facilitate identification and localization of individual features on the patterned surface, including the sites at which the molecules are located. Fiducials are useful for registering the spatial locations of sites or features since the fiducials provide a region or point of reference for relative locations of such sites or features. Fiducials are useful for applications where a support and sites are detected repeatedly to follow changes occurring at individual sites over time and successive cycles of processing. For example, fiducials can allow individual nucleic acid clusters to be followed through successive images obtained over multiple sequencing cycles, such that the sequence of nucleic acid species present at individual clusters can be accurately determined.

With the preceding in mind, in certain, real-world implementations the present techniques facilitate the generation of a quantitative measure of focus quality for images of fluorescent emitters on a patterned flow cell substrate, which may be processed using a nucleic acid sequencer or comparable image-based system. In such contexts focus quality may be quantified using the presently described metrics regardless of instrument or instrument type, flow cell type, or position on a flow cell. By way of example, a fluorescence image of a flow cell may be acquired by a sequencer (i.e., a sequencing system). Sub-regions of the fluorescence image may be defined and, for one or more of the sub-regions, respective discrete Fourier transforms and power spectral density may be calculated. In one such example, the radial mean (or other measure of central tendency, such as median or mode) of the resulting power spectrum is calculated. A least squares fit (or other suitable measure of fit) is generated to fit a piece-wise function to the power spectrum (e.g., an integrated power versus radius plot) and the fitted function is used to derive values for one or more of: (1) a radial slope, which corresponds to the quality of focus, (2) a corner frequency, which determines the maximum spatial frequency for which focus information is found, and (3) a noise floor, below which no useful information is obtained.

In such a sequencer context, and as discussed herein, the derived focus quality metric (i.e., the radial slope) is largely insensitive to the intensity of the fluorescent emitters on the patterned surface. As a result, the focus quality metric is robust in the presence of the normal variability seen in the grafting and template hybridization processes, as well as to non-uniformity in the excitation intensity. Further, since the present approach in such a sequencing context relies on periodic information generated from thousands to tens of thousands of fluorescent emitters in the field of view, it is insensitive to normal non-uniformities in the acquired fluorescent images. Additional benefits may also include the generation of additional diagnostic data regarding the point spread function (PSF) (e.g., based upon a Lorentzian distribution profile) of the optical system generating the images as well as information regarding sample plane tilt (i.e., the tilt of focal plane associated with the substrate or surface being imaged). Such information may be valuable as part of an initial or one-time calibration, as part of a calibration or re-calibration performed periodically, or as part of a repeated or run-time recalibration performed during a respective scanning operation at intervals (e.g., every 10, 20, 30, 40, or 50 cycles) so as to initialize, update, or calibrate a focus model used to maintain focus quality throughout the scanning process. In addition, in certain implementations of the focus quality quantification techniques described herein, a Gaussian distribution profile for the PSF is not assumed (unlike in other, conventional approaches). Indeed, a Lorentzian distribution profile, in certain embodiments, may better describe the PSF. Because a Gaussian profile is not assumed, the presently disclosed focus quality quantification techniques are more flexible in their application than other approaches that rely on such an assumption.

With the preceding in mind, several examples will be described herein with respect to the generation and use of focus metrics and/or focus models parameterized or calibrated using such metrics and to their use in systems and methods of analysis. It will be understood that systems are also provided for carrying out the methods in an automated or semi-automated way, and that such systems will include a processor, a data storage device, and a program for image analysis, the program including processor-executable instructions for carrying out one or more methods provided for generating focus metrics using discrete Fourier transforms and of using such focus metrics in real-world imaging contexts, such as nucleic acid sequencing contexts. Accordingly, methods discussed herein can be carried out on a computer, for example, having components and executable routines needed for such purposes.

The methods and systems described herein may be employed for analyzing any of a variety of materials, such as biological samples and molecules, which may be on or in a variety of objects. Useful objects are solid supports or solid-phase surfaces with attached analytes. The methods and systems described may provide advantages in assessing, and correcting, imager focus quality when used with objects having a repeating pattern of features in an x, y plane, such as a patterned flow cell having an attached collection of molecules, such as DNA, RNA, biological material from viruses, proteins, antibodies, carbohydrates, small molecules (such as drug candidates), biologically active molecules, or any other analytes of interest.

While the preceding provides useful background and context with respect to terminology and processes, the following provides an example of suitable systems and functional workflows that may utilize or process sample substrates with the benefit of a focus quality metric as described herein. By way of example, FIG. 1 depicts an example of an optical image scanning system 10, such as a sequencing system, that may be used in conjunction with the disclosed focus quality quantification techniques to process biological samples. With respect to such an imaging system 10, it may be appreciated that such imaging systems typically include a sample stage or support that holds a sample or other object to be imaged (e.g., a flow cell or sequencing cartridge having a patterned surface of spaced apart sample sites) and an optical stage that includes the optics used for the imaging operations. Focusing operations for such an imaging system 10 typically involve moving the optical stage relative to the sample stage. As part of their operation, such an imaging system may be operated in one mode to generate a focus model, such as by holding a sample stage at a fixed position relative to the optical stage for a period of time to acquire focus information. As discussed herein, as part of focus model generation (or recalibration) a focus quality metric as described herein may be generated to parameterize or update the focus model. In a separate sequencing operation mode, fast focusing adjustments may be performed using the calibrated focus model to maintain adequate throughput.

Turning to FIG. 1, the example image scanning system may include a device for obtaining or producing an image of a region, such as a tile, sub-tile, or line (e.g., row of sample sites or row of pixels) of a flow cell. The example illustrated in FIG. 1 shows an example image scanning system configured in a backlight operational configuration. In the depicted example, subject samples are located on sample container 110, which is positioned on a sample stage 170 under an objective lens 142. Light source 160 and associated optics direct a beam of light, such as laser light or superluminescent light emitting diode (SLED), to a chosen sample location on the sample container 110. The sample fluoresces and the resultant light is collected by the objective lens 142 and directed to a photodetector 140 to detect the florescence. Sample stage 170 is moved relative to objective lens 142 to position the next sample location on sample container 110 at the focal point of the objective lens 142. Movement of sample stage 170 relative to objective lens 142 can be achieved by moving the sample stage itself, the objective lens, the entire optical stage, or any combination of these structures. Further examples may also include moving the entire imaging system over a stationary sample.

A fluid delivery module or device 100, as discussed in greater detail below, directs a flow of reagents (e.g., fluorescent nucleotides, buffers, enzymes, cleavage reagents, etc.) to (and through) the sample container 110 and waste valve 120. In some applications, the sample container 110 can be implemented as a flow cell that includes clusters of nucleic acid sequences at a plurality of sample locations on the sample container 110. The samples to be sequenced may be attached to the substrate of the flow cell, along with other optional components. In practice, the plurality of sample locations provided on a surface of the flow cell may be arranged as spaced apart sample sites, which in turn may be subdivided into tile, sub-tile, and line regions each comprising a corresponding subset of the plurality of sample locations.

The depicted example image scanning system 10 also comprises temperature station actuator 130 and heater/cooler 135 that can optionally regulate the temperature of conditions of the fluids within the sample container 110. Camera system (e.g., photodetector system 140) can be included to monitor and track the sequencing of sample container 110. The photodetector system 140 can be implemented, for example, as a CCD camera, which can interact with various filters within filter switching assembly 145, objective lens 142. The photodetector system 140 is not limited to a CCD camera and other cameras and image sensor technologies can be used. A focusing assembly (e.g., focusing emitter 150 (e.g., a focusing laser or SLED) and focusing detector 141) may also be provided that operates in conjunction with a focus model (as discussed herein) to provide rapid or real-time focus measurements based on the calibration of the focus assembly to the focus model.

Light source 160 (e.g., an excitation emitter (e.g., laser or SLED) within an assembly optionally comprising multiple emitters) can be included to illuminate fluorescent sequencing reactions within the samples via illumination through a fiber optic interface 161 (which can optionally comprise one or more re-imaging lenses, a fiber optic mounting, etc.). Low watt lamp 165 and reverse dichroic 185 are also presented in the example shown. In some applications focusing emitter 150 may be turned off during imaging. In other applications, an alternative focus configuration can include a second focusing camera, which can be a quadrant detector, a position sensitive detector, or similar detector to measure the location of the scattered beam reflected from the surface concurrent with data collection. In such alternative configurations, the focus model as discussed herein may still be employed to calibrate operation of the fast focus detection mechanism.

Although illustrated as a backlit device, other examples may include a light from a laser, SLED, or other light source that is directed through the objective lens 142 onto the samples on sample container 110 (i.e., a frontlit configuration). Sample container 110 can be mounted on a sample stage 170 to provide movement and alignment of the sample container 110 relative to the objective lens 142. The sample stage 170 can have one or more actuators to allow it to move in any of three directions. For example, in terms of the Cartesian coordinate system, actuators can be provided to allow the stage to move in the x-, y- and z-directions relative to the objective lens 142. This can allow one or more sample locations on sample container 110 to be positioned in optical alignment with objective lens 142.

A focus component 175 is shown in this example as being included to control positioning of the optical components relative to the sample container 110 in the focus direction (typically referred to as the z-axis, or z-direction). Focus component 175 can include one or more actuators physically coupled to the optical stage or the sample stage, or both, to move sample container 110 on sample stage 170 relative to the optical components (e.g., the objective lens 142) to provide proper focusing for the imaging operation. For example, the actuator may be physically coupled to the respective stage such as, for example, by mechanical, magnetic, fluidic or other attachment or contact directly or indirectly to or with the stage. The one or more actuators can be configured to move the stage in the z-direction while maintaining the sample stage in the same plane (e.g., maintaining a level or horizontal attitude, perpendicular to the optical axis). The one or more actuators can also be configured to tilt the stage. This can be done, for example, so that sample container 110 can be leveled dynamically to account for any slope in its surfaces.

Focusing of the system generally refers to aligning the focal plane of the objective lens 142 with the sample to be imaged at the chosen sample location. However, focusing can also refer to adjustments to the system to obtain or enhance a desired characteristic for a representation of the sample such as, for example, a desired level of sharpness or contrast for an image of a test sample. Because the usable depth of field of the focal plane of the objective lens 142 may be very small (sometimes on the order of 1 μm or less), focus component 175 closely follows the surface being imaged. Because the sample container may not be perfectly flat as fixtured in the instrument, focus component 175 may be set up to follow this profile while moving along in the scanning direction (typically referred to as the y-axis).

The light emanating from a test sample at a sample location being imaged can be directed to one or more photodetectors 140. Photodetectors can include, for example a CCD camera. An aperture can be included and positioned to allow only light emanating from the focus area to pass to the photodetector(s). The aperture can be included to improve image quality by filtering out components of the light that emanate from areas that are outside of the focus area. Emission filters can be included in filter switching assembly 145, which can be selected to record a determined emission wavelength and to block any stray light.

In various examples, sample container 110 (e.g., a flow cell) can include one or more substrates upon which the samples are provided. For example, in the case of a system to analyze a large number of different nucleic acid sequences, sample container 110 can include one or more substrates on which nucleic acids to be sequenced are bound, attached or associated. In various examples, the substrate can include any inert substrate or matrix to which nucleic acids can be attached, such as for example glass surfaces, plastic surfaces, latex, dextran, polystyrene surfaces, polypropylene surfaces, polyacrylamide gels, gold surfaces, and silicon wafers. In some applications, the substrate is within a channel or other area at a plurality of locations formed in a matrix or pattern across the sample container 110.

One or more controllers 190 (e.g., processor or ASIC based controller(s)) can be provided to control the operation of a scanning system, such as the example image scanning system 10 described with reference to FIG. 1. The controller 190 can be implemented to control aspects of system operation such as, for example, scanning, focusing (e.g., measurement or quantification of focus quality, adjustment of focus, and so forth, stage movement and adjustment, and imaging operations. In various applications, the controller can be implemented using hardware, software, or a combination of the preceding. For example, in some implementations the controller can include one or more CPUs or processors with associated memory. As another example, the controller can comprise hardware or other circuitry to control the operation. For example, this circuitry can include one or more of the following: field programmable gate arrays (FPGA), application specific integrated circuits (ASIC), programmable logic devices (PLD), complex programmable logic devices (CPLD), a programmable logic array (PLA), programmable array logic (PAL), or other similar processing device or circuitry. As yet another example, the controller can comprise a combination of this circuitry with one or more processors.

Although generation and/or use of focus quality metrics, and focus models utilizing or based on such metrics, may be described and discussed herein in the context of this example system, this is only one example with which these techniques might be implemented. After reading this description, one of ordinary skill in the art will understand how the systems and methods described herein can be implemented with this and other scanners, microscopes and other imaging systems.

Figure 2:
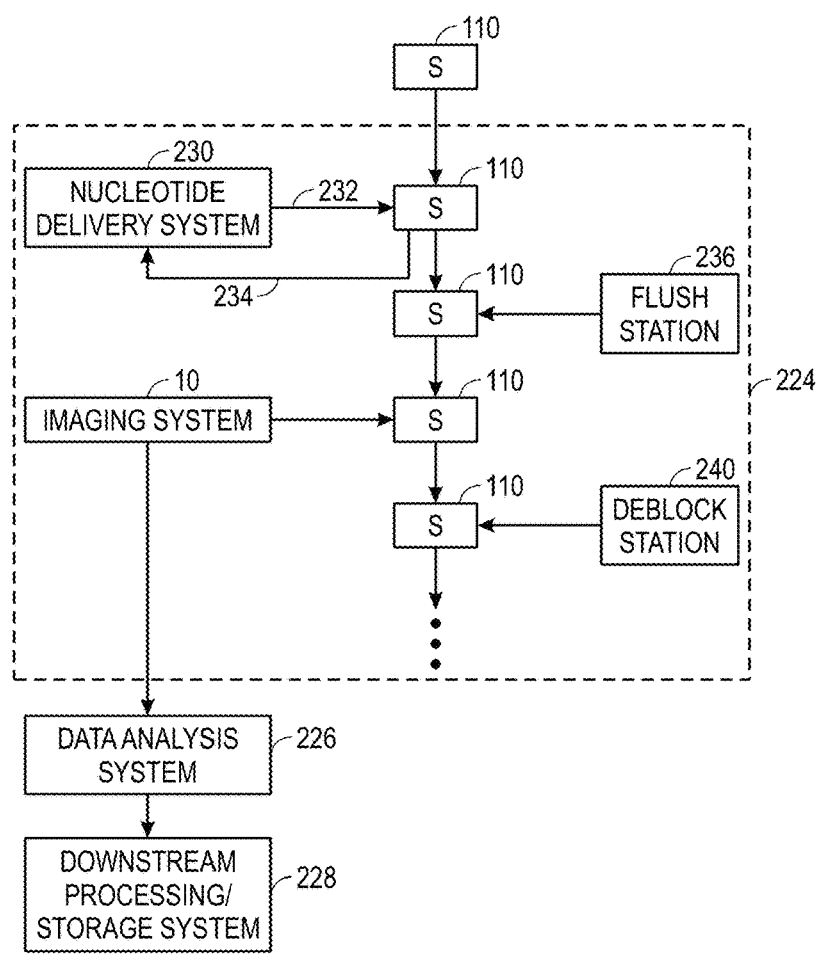
FIG. 2 is a block diagram illustration of an imaging and image processing system, such as for biological samples, in accordance with the present disclosure.

While the preceding description covers components and features of an optical image scanning system 10, such as a sequencing system, FIG. 2 discusses the use of such a system 10 in the context of a functional work flow. This discussion is provided in order to provide useful, real-world context for the subsequent discussion of the generation and use of focus quality metrics. In this manner, it is hoped that the use and significance of focus quality metrics as subsequently described will be more fully appreciated.

With this in mind, and turning to FIG. 2, a block diagram illustrating an example work flow in conjunction with system components is provided. In this example, the work flow and corresponding system components may be suitable for processing patterned flow cells (such as for biological applications), imaging the patterned flow cell surface, and analyzing data derived from the imaging.

In the illustrated example, molecules (such as nucleotides, oligonucleotides, and other bioactive reagents) may be introduced into a respective sample container 110 that may be prepared in advance. As noted herein, such sample containers 110 may comprise flow cells, sequencing cartridges, or other suitable structures having substrates encompassing sample sites for imaging. The depicted work flow with system components may be utilized for synthesizing biopolymers, such as DNA chains, or for sequencing biopolymers. However, it should be understood that the present technique is not limited to sequencing operations, gene expression operations, diagnostic applications, and so forth, but may be used more generally for processing collected image data to derive focus quality metrics, such as for swaths or regions detected from imaging of a sample or sample holder, as described below. Other substrates containing patterned or otherwise detectable features can similarly be used with the techniques and systems disclosed.

In the present context, example biopolymers may include, but are not limited to, nucleic acids, such as DNA, RNA, or analogs of DNA or RNA. Other example biopolymers may include proteins (also referred to as polypeptides), polysaccharides, or analogs thereof. Although any of a variety of biopolymers may be processed in accordance with the described techniques, to facilitate and simplify explanation the systems and methods used for processing and imaging in the example context will be described with regard to the processing of nucleic acids. In general, the described work flow will process sample container 110, each of which may include a patterned surface of reaction sites. As used herein, a "patterned surface" refers to a surface of a support or substrate having a population of different discrete and spaced apart reaction sites, such that different reaction sites can be differentiated from each other according to their relative location. A single species of biopolymer may be attached to each individual reaction site. However, multiple copies of a species of biopolymer can be attached to a reaction site. The pattern, taken as a whole, may include a plurality of different biopolymers attached at a plurality of different sites. Reaction sites can be located at different addressable locations on the same substrate. Alternatively, a patterned surface can include separate substrates each forming a different reaction site. The sites may include fragments of DNA attached at specific, known locations, or may be wells or nanowells in which a target product is to be synthesized. In some applications, the system may be designed for continuously synthesizing or sequencing molecules, such as polymeric molecules based upon common nucleotides.

In the diagrammatical representation of FIG. 2, an analysis system may include a processing system 224 (e.g., a sequencing system or station) designed to process samples provided within sample containers 110 (such as may include patterned surfaces), and to generate image data representative of individual sites on the patterned surface, as well as spaces between sites, and representations of fiducials provided in or on the patterned surface. A data analysis system 226 receives the image data and processes the image data in accordance with the present disclosure to extract meaningful values from the imaging data as described herein. A downstream processing/storage system 228, then, may receive this information and store the information, along with imaging data, where desired. The downstream processing/storage system 228 may further analyze the image data or processed data derived from the image data, such as to diagnose physiological conditions, compile sequencing lists, analyze gene expression, and so forth.

With respect to the data analysis system 226 and/or the downstream process/storage system 228 as may be relevant to the present context, image data may be analyzed using a real-time analysis (RTA) protocol commercially available for Illumina sequencers. Dark (non-signal producing regions or pixels) and light (signal producing regions or pixels) may be assigned an intensity level of 0 and 255, respectively, or any desired other level or levels between these.

The processing system 224 may employ a biomolecule reagent delivery system (shown as a nucleotide delivery system 230 in the example of FIG. 2) for delivering various reagents to a sample container 110 as processing progresses. The biomolecule reagent delivery system may correspond to the fluid delivery module or device 100 of FIG. 1. Processing system 224 may perform a plurality of operations through which sample container 110 and corresponding samples progress. This progression can be achieved in a number of ways including, for example, physical movement of the sample container 110 to different stations, or loading of the sample container 110 (such as a flow cell) in a system in which the sample container 110 is moved or an optical system is moved, or both, or the delivery of fluids is performed via valve actuation. A system may be designed for cyclic operation in which reactions are promoted with single nucleotides or with oligonucleotides, followed by flushing, imaging and de-blocking in preparation for a subsequent cycle. In a practical system, the sample containers 110 and corresponding samples are disposed in the processing system 224 and an automated or semi-automated sequence of operations is performed for reactions, flushing, imaging, de-blocking, and so forth, in a number of successive cycles before all useful information is extracted from the test sample. Again, it should be noted that the work flow illustrated in FIG. 2 is not limiting, and the present techniques may operate on image data acquired from any suitable system employed for any application. It should be noted that while reference is made in the present disclosure to "imaging" or "image data", in many practical systems this will entail actual optical imaging and extraction of data from electronic detection circuits (e.g., cameras or imaging electronic circuits or chips), although other detection techniques may also be employed, and the resulting electronic or digital detected data characterizing the molecules of interest should also be considered as "images" or "image data".

In the example illustrated in FIG. 2, the nucleotide delivery system 230 provides a process stream 232 to the sample containers 110. An effluent stream 234 from the sample containers 110 (e.g., a flow cell) may be recaptured and recirculated, for example, in the nucleotide delivery system 230. In the illustrated example, the patterned surface of the flow cell may be flushed at a flush station 236 (or in many cases by flushing by actuation of appropriate valving, such as waste valve 120 of FIG. 1) to remove additional reagents and to clarify the sample within the sample containers 110 for imaging. The sample containers 110 is then imaged, such as using line imaging or area imaging techniques, by an imaging system 10 (which may be within the same device). The image data thereby generated may be analyzed, for example, for determination of the sequence of a progressively building nucleotide chain, such as based upon a template. In one possible embodiment, the imaging system 10 may employ confocal line scanning to produce progressive pixilated image data that can be analyzed to locate individual sites on the patterned surface and to determine the type of nucleotide that was most recently attached or bound to each site. Other imaging techniques may also suitably be employed, such as techniques employing "step and shoot" or other area-based imaging approaches.

As noted, the imaging components of the imaging system 10 may be more generally considered a "detection apparatus", and any detection apparatus that is capable of high-resolution imaging of surfaces may be employed. In some examples, the detection apparatus will have sufficient resolution to distinguish features at the densities, pitches and/or feature sizes set forth herein. Examples of the detection apparatus are those that are configured to maintain an object and detector in a known geometric relationship while obtaining an area image. As noted, a line scanning apparatus (e.g., a time delay and integration (TDI) scan apparatus) can be used, as well as systems that obtain continuous or successive area images (e.g., "step and shoot" detectors). Line scanning detectors can be configured to scan a line in a cross sample (denoted the x-dimension conventionally) on the flow cell (or other sample-holding substrate) while the flow cell is progressively moved in a scanning or scan direction (denoted the y-dimension conventionally). It will be understood that the detection device, object, or both can be moved to achieve scanning detection. Detection apparatuses that are useful, for example in nucleic acid sequencing applications, are described in U.S. Pat. App. Pub. Nos. 2012/0270305 A1; 2013/0023422 A1; and 2013/0260372 A1; and U.S. Pat. Nos. 5,528,050; 5,719,391; 8,158,926 and 8,241,573, all of which are incorporated herein by reference in their entirety for all purposes.

In one example, and as discussed in greater detail herein, an imaging system 10 that is used in a method or system set forth herein may scan along the y-dimension of a patterned surface, scanning parallel swaths or lines of sites of the patterned surface in the process. The patterned surface may include coarse-alignment markers that distinguish the relative locations of the swaths of sites along the x-dimension. When used, the coarse-alignment markers can cooperate with the detection apparatus, such as to determine the location of at least one of the swaths of sites. Optionally, the relative position of the detection apparatus and/or the sample container 110 having the patterned surface may be adjusted based on the location determined for the swaths. In some examples, the determining of the location of the swaths can be performed by an algorithm by a processor or computer, such as a computer used to perform registration or feature identification. Thus, the system may function to perform the algorithm on the computer to determine locations for the features in the image data, as well as to characterize molecules at each site.

Following imaging (e.g., at imaging system 10), the sample container 110 may progress to a deblock station 240 for de-blocking, during which a blocking molecule or protecting group is cleaved from the last added nucleotide, along with a marking dye. If the processing system 224 is used for sequencing, by way of example, image data from the imaging system 10 will be stored and forwarded to a data analysis system 226.

The data analysis system 226 may include a general purpose or application-specific programmed computer, which provides a user interface and automated or semi-automated analysis of the image data to determine which of the four common DNA nucleotides may have been last added at each of the sites on a patterned surface, as described below. As will be appreciated by those skilled in the art, such analysis may be performed based upon the color of unique tagging dyes for each of the four common DNA nucleotides and, hence, multiple images at one or more light frequencies or combinations of light frequencies may be obtained for each imaged region of the patterned surface. This image data may be further analyzed by the downstream processing/storage system 228, which may store data derived from the image data as described below, as well as the image data itself, where appropriate. Again, the sequencing application is intended to be one example, and other operations, such as diagnostic applications, clinical applications, gene expression experiments, and so forth may be carried out that will generate similar imaging data operated on by the present techniques.

As noted above, in some implementations, the sample container 110 (e.g., a flow cell) having the patterned surface may remain in a fixed position, and the "stations" referred to may include integrated subsystems that act on the sample container 110 as described (e.g., for introduction and reaction with desired chemistries, flushing, imaging, image data collection, and so forth). Data analysis may be performed contemporaneously with the other processing operations (i.e., in "real time"), or may be done post-processing by accessing the image data, or data derived from the image data, from an appropriate memory (in the same system, or elsewhere). In many applications, a patterned surface "container" will comprise a cartridge or flow cell in which the patterned surface exists and through which the desired chemistry is circulated. In such applications, imaging may be done through and via the flow cell. The flow cell may be appropriately located (e.g., in the x-y plane), and moved (e.g., in x-, y-, and z-directions) as needed for imaging. Connections for the desired chemistry may be made directly to the flow cell when it is mounted in the apparatus. Moreover, depending upon the device design and the imaging technique used, the patterned surface, encased in the flow cell, may be initially located in the x-y plane, and moved in this plane during imaging, or imaging components may be moved parallel to this plane during imaging. In general, here again, the "x-y plane" is the plane of the patterned surface that supports the sites, or a plane parallel to this. The flow cell, therefore, may be said to extend in the x-y plane, with the x-direction being the cross-sample direction and the y-direction corresponding to the scanning direction in which the flow cell undergoes relative motion during a scan operation. It is to be understood, however, that this orientation could be reversed or otherwise varied. The flow cell and corresponding patterned surface may also be moved in the z-direction, which is the focus-direction, typically orthogonal to the plane defined by the x- and y-dimensions. Such movements may be useful for securing the flow cell into place, for making fluid connections to the flow cell, and for imaging (e.g., focusing the optic for imaging sites at precise z-depths). In some applications, the optic may be moved in the x-direction for precise imaging.

Figure 3:
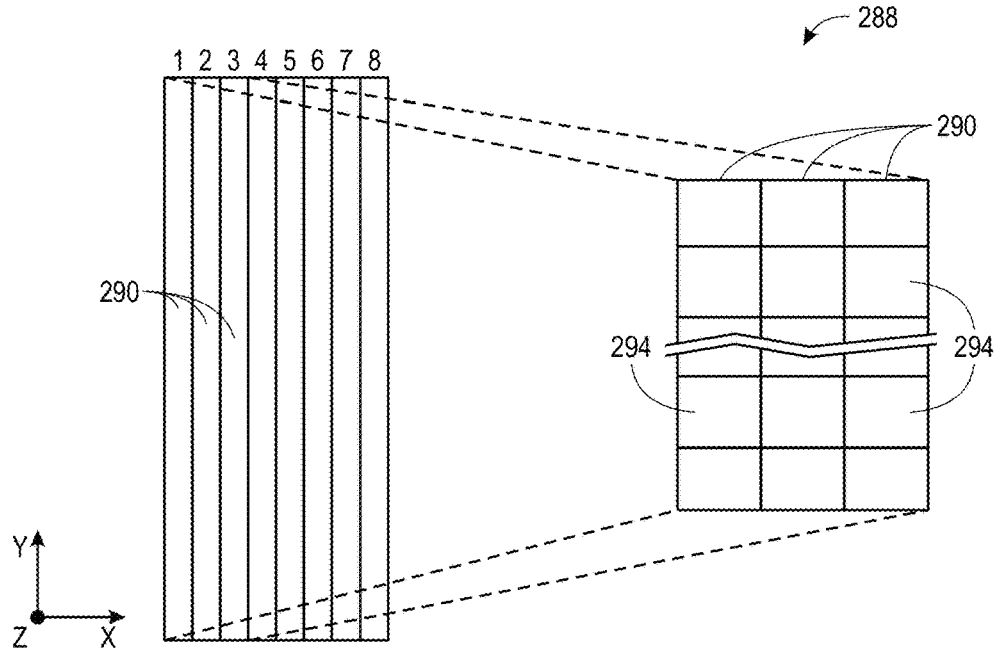
FIG. 3 is a plan view of an example patterned surface, in accordance with the present disclosure.

With the preceding in mind, FIG. 3 illustrates an example of a patterned surface 288 that may be present as part of or within a sample container 110. As shown in FIG. 3, a plurality of grids or swaths 290 (here depicted as vertical swaths in the y-dimension) may be provided such that each includes a multitude of individual tiles 294 to be imaged. Each image tile 294 in turn comprises a multitudes of sample sites (e.g., capture or reaction sites) which may display activity of interest at different cycles of a processing operation (e.g., a sequencing operation). As noted herein, a wide range of layouts for patterned surfaces 288 are possible, and the present techniques are not intended to be limited to any desired or particular layout. In a progressive line scanning context, as imaging progresses, the sample container 110 (or patterned surface 288 therein) will undergo relative motion in an indexed direction so that each of the swaths 290 can be imaged. It should be noted that in the view of FIG. 3, the surrounding flow cell in which the patterned surface 288 may be located is not shown.

Figure 4:
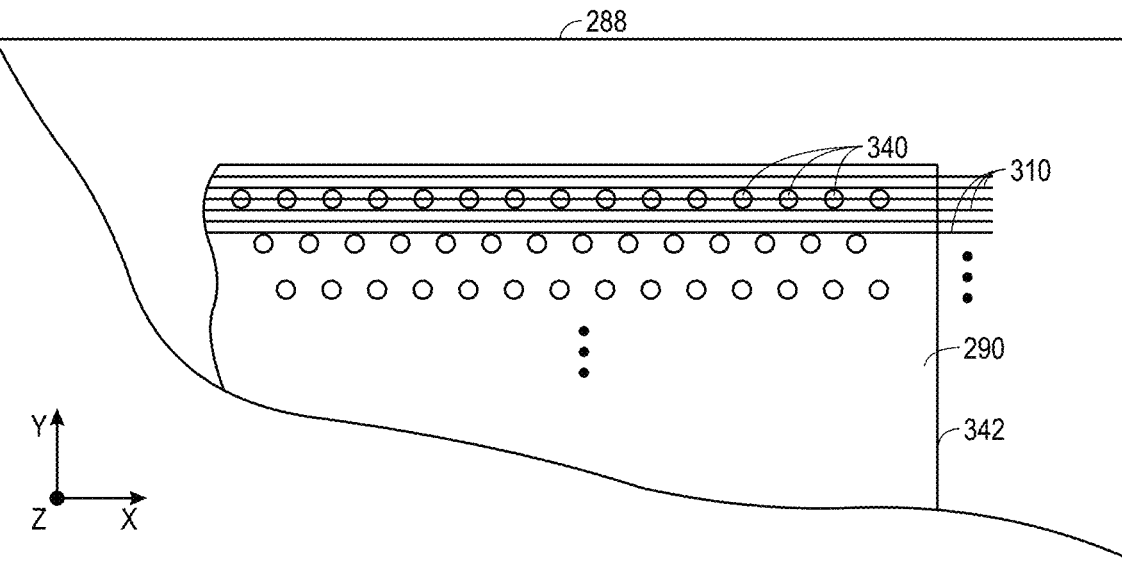
FIG. 4 is a further cut-away diagram illustrating sites on an example patterned flow cell surface, in accordance with the present disclosure.

FIG. 4 illustrates, in somewhat greater detail, scan lines 310 over a plurality of sample sites 340 (e.g., wells or nanowells) in a swath 290. By way of example, in the context of a flow cell the sites 340 may be gel-filled wells, each well occupied by a nucleic acid (e.g., DNA) colony. As noted above, in some implementations, the sites 340 may be laid out in any suitable grid pattern. In the illustrated example, the sites 340 are laid out in a hexagonal pattern, although rectangular patterns (e.g., rectilinear patterns), and other patterns may be employed. The location of each site 340 will be known with reference to one or more fiducial or reference features, such as an edge 342 of the grid or portion of the patterned surface.

Figure 5:
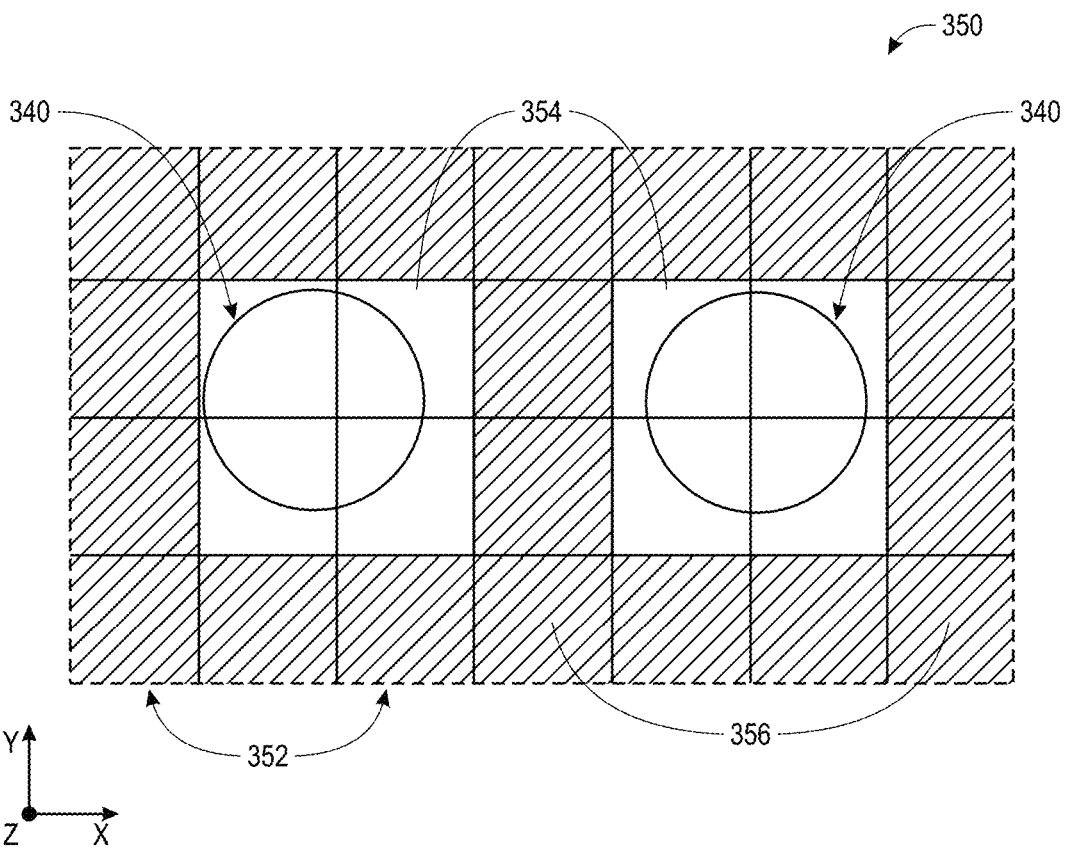
FIG. 5 is an enlarged view of two example sites of a patterned flow cell surface illustrating pixilation in image data for the sites during processing.

FIG. 5 represents a portion of an example image of a type that may be generated based upon image data collected by progressive scanning of a region of interest of a patterned surface. The actual image 350 is composed of a large number of pixels 352 each of which is assigned a digital value by the imaging system 10. In a contemplated context the pixel data, which represents the image 350, may encode values corresponding to bright or light pixels 354 and darker pixels 356. By way of example, dark (i.e., non-signal producing regions or pixels) and light (i.e., signal producing regions or pixels) may be assigned an intensity level of 0 and 255, respectively, or any desired other level or levels between these. In practice, various grey levels or even color encoding can be employed such that the individual sites 340 can be identified by detecting contrast or color value differences between the pixels as indicated by their individual digital values. Of note, in the presently described sequencing context, and in contrast to other conventional imaging operations, the images 350 in question are not fully resolved, and may be correspondingly under-sampled due to the size of the features (e.g., sample wells or sites 340) of interest, the dimensions of the pixels 352, and the aliasing that may be performed in forming the image 350. Due to the images 350 not being fully-resolved, assessment of focus quality may be further complicated using conventional approaches, though the focus quality metrics derived as discussed herein are suitable for use with such images 350.

As may be appreciated from the preceding background discussion and context, focusing operations can be an important part of the imaging process used to generate image data of a patterned surface of a flow cell, or other substrate, as part of a sequencing or other analytic or diagnostic operation. As previously noted, and as discussed herein, a focus model can be prepared for an imaging operation (e.g., a sequencing run to process a flow cell) and the focus model can then be used to initially position, monitor, and correct the position of the objective lens 142 relative to the samples on the patterned surface during imaging operations. The focus model may be used during operation in conjunction with a focus beam generated by a focusing emitter 150, which is reflected off of the sample location to measure the required focus, and the sample stage is moved relative to the optical stage to focus the optical stage onto a current sample location. By way of example, the focus beam is calibrated with respect to the focus model so that a given measurement of the focus beam during operation can be used to verify focus at the sample site or to provide an indication of a needed correction to the focal height. As discussed herein, for a given sequencing run, a focus quality metric may be initially or periodically calculated and used to parameterize or re-calibrate the focus model.

The movement of the sample stage 170 relative to the optical stage for focusing adjustments during imaging is generally described as movement along the z-axis or in the z direction. The terms "z-axis" and "z direction" are intended to be used consistently with their use in the art of microscopy and imaging systems in general, in which the z-axis refers to the focal axis. Accordingly, a z-axis translation results in increasing or decreasing the length of the focal axis. A z-axis translation can be carried out, for example, by moving a sample stage 170 relative to an optical stage (e.g., by moving the sample stage or an optical element or both). As such, z-axis translation can be carried out by driving an objective lens 142, the optical stage, or the sample stage 170, or a combination of the preceding, any of which can be driven by actuating one or more servos or motors or other actuators that are in functional communication with the objective lens 142 or the sample stage 170 or both. In practice the sample stage may be tilted relative to the optical stage to, for example, effectively level the sample container (e.g., flow cell) on a plane perpendicular to the optical imaging axis. Although this disclosure adopts the terminology z-axis and the direction, it should be understood that this is done for clarity of description and consistency with conventional terminology. The principles disclosed herein are not dependent on these mnemonics, and other terminology can be used to describe movement in the x, y and z directions.

Figure 6:
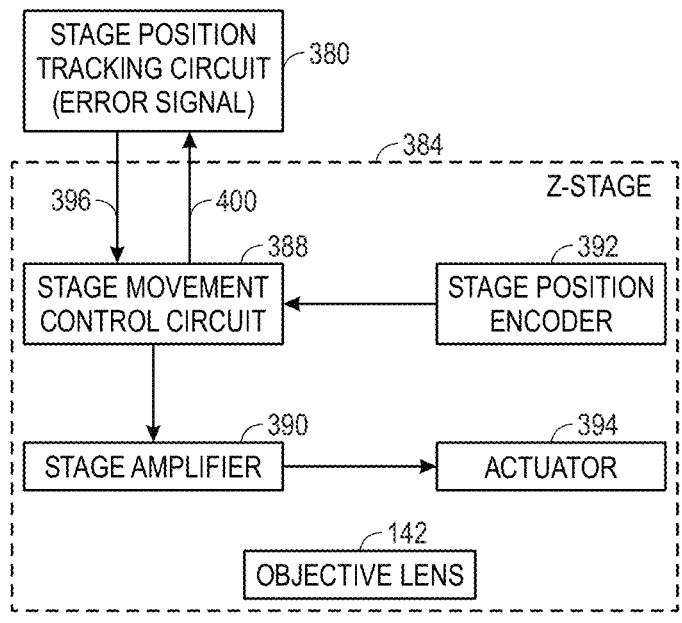
FIG. 6 is a block diagram illustrating an example focus control system for focus operations, in accordance with the present disclosure.

FIG. 6 is a block diagram illustrating an example focus control system for focus operations, which may use a focus model as discussed herein as an input or baseline. This example focus control system includes focus tracking circuitry 380 that is configured to determine the current focus settings that are used to generate the drive signal that drives the focus tracking feedback loop in the z-stage 384. As illustrated in the example of FIG. 6, commands 396, based on the focus settings difference, are fed to the z-stage 384 to control movement of the z-stage 384.

In this example, the z-stage 384 is configured to move the objective lens 142. Actuator 394 moves the optical stage, and in particular the objective lens 142, in response to the drive signal provided by the z-stage amplifier 390. As noted above, actuator 394 can include a piezoelectric actuator, a voice coil actuator, a motor, or other like actuators. A position encoder 392 provides information about the actuator position and its movement. This encoder information 400 can be fed back through the z-stage controller 388 to focus tracking circuitry 380 and can be used in determining the error signal.

Controllers used to control the movement can be implemented using a proportional, integral and derivative (PID) controller with feedforward, including both position and velocity controllers. They can include proportional, integral and derivative control for both the error signal and the feedforward control branches. Some examples can also include additional filters and trajectory generation that can be used to improve the stability of the system depending on the use cases.

Figure 7:
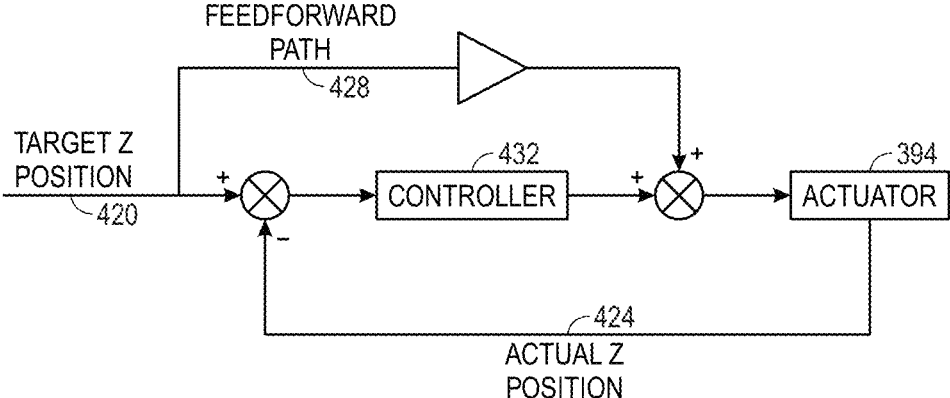
FIG. 7 is a diagram illustrating an example architecture for a z-stage controller, in accordance with the present disclosure.

FIG. 7 is a diagram illustrating an example architecture for a z-stage controller in accordance with one example of the systems and methods described herein. This example controller incorporates both feedforward and feedback control to generate the drive signal to control the stage actuator 394. In some examples, this can be implemented as a PID control for either or both the error signal and the feedforward control branches of the control system. As illustrated in this example, the difference between the target z-position (i.e., focus setting) 420 and the actual z-position 424 are computed and fed to control block 432. Position information is also sent via feedforward path 428 and added to the output signal of control block 432. This output signal from drive circuitry within the control block 432 provides the control output signal, which is used to drive actuator 394. As shown, the magnitude of the difference between the target focus position and the actual position is provided via the feedforward path 428 to adjust the control output signal.

The preceding discussion relates to various aspects of implementations of optical image scanning systems, such as a sequencing system, and examples of focusing control systems and logic that may be employed in such a system. As discussed herein, focus assessment, adjustment, and control is relevant to multiple steps in image-based nucleic acid sequencing operations, such as flow cell registration, focus model generation, focal plane mapping, and focus tracking during sequencing runs. Conventional approaches rely on Brenner image processing to asses focus. However, as noted herein, approaches based on Brenner scores suffer from lack of robustness when the intensity of fluorophores across the flow cell surface is non-uniform and/or changes over time (i.e., when there are spatial and/or temporal intensity non-uniformities). Correspondingly, Brenner scores are not robust in that they do not allow (due to being intensity dependent) comparison across instruments or flow cells, or even across image sub-tiles in some instances.

With this context in mind, various techniques are described herein for deriving a focus quality metric that is intensity independent and that may be employed to establish, verify, and maintain focus quality as part of an imaging operation, including imaging operations performed on flow cells used in nucleic acid sequencing. As described in greater detail below, the presently disclosed approach utilizes discrete Fourier transforms (DFTs) or other suitable transforms to provide an intensity independent technique for quantifying focus quality of fluorescent emitters on a flow cell surface. Because the technique is robust to intensity fluctuations, it can be used on images exhibiting photobleaching or other intensity varying dynamics.

As discussed below, the presently described technique leverages the regularly patterned (e.g., periodically patterned) surfaces associated with patterned flow cells in combination with discrete Fourier transforms to generate intensity independent measures that correspond to focus. This methodology allows for quantification of focus quality regardless of instrument, flow cell type, or position (e.g., image tile or sub-tile) on a flow cell. The quantified focus quality (i.e., a focus quality metric) so obtained may then be used to parameterize or calibrate a focus model for use during a sequencing operation for monitoring and adjusting focus during the sequencing operation.

Figure 8:
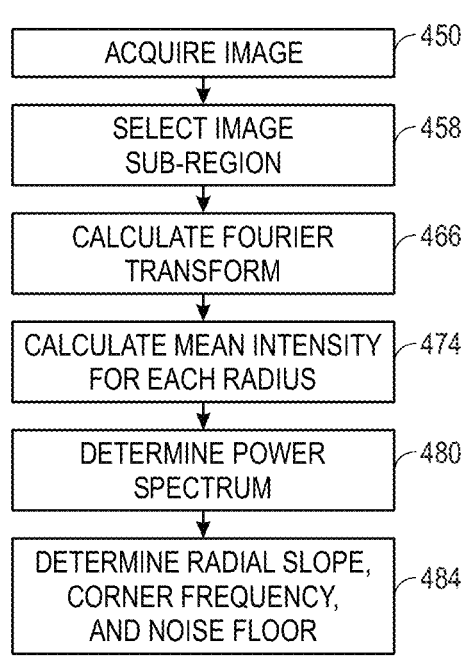
FIG. 8 depicts a process flow illustrating steps in the generation of a focus quality metric, in accordance with the present disclosure.

Turning to the figures, FIGS. 8-11 illustrate aspects of the generation of focus quality metrics in accordance with the disclosed techniques. In particular, FIG. 8 is a generalized process flow of steps that may be employed in the generation of a focus quality metric in accordance with one possible implementation, while FIGS. 9-11 graphically illustrate aspects of this process flow. Turning to FIG. 8, the depicted process starts with the acquisition (step 450) of an image, such as an image of a flow cell or other sample binding or containing surface. By way of example, the image may, in part or in whole, correspond to an image of a patterned surface 288, a grid or swath 290 of such a surface, an image tile 294 within such a swath 290, a sub-tile selected from a larger tile 294, a row of pixels 352, or a row of sample sites 340 within an image. Further, the image may be composed of a single shot or acquisition of the imaged region or as a time-delay integration performed line-by-line or may be constructed via a combinatorial process, such as to combine multi-phase acquisitions into a single image for processing, such as via averaging across the multi-phase acquisitions to generate the image.

As previously noted, in the context of a nucleic acid sequencing operation, each region of the patterned surface may be imaged more than once (i.e., once for each color channel, such as blue and green), with different sample sites being "on" or "off" in a given imaging cycle based upon the light frequency used to generate the respective image. As a result, there may be more than one image of each region, with each image corresponding to a different color or intensity channel and having different sample sites active or not active. In practice, each color channel may have a separate optimal focus. With this in mind, and with respect to the present technique, focus quality metrics may be generated for images derived for only one color channel (e.g., the blue channel or the green channel), such as for a color channel determined to be sufficient for maintaining focus of the system. Alternatively, focus quality metrics may be generated for two or more of the color channels separately (e.g., blue channel focus metrics and green channel focus metrics) and an intermediary focus height determined that is acceptable for the imaging using each color channels. In this manner, a single focus height may be determined that may be used for acquisition of images using, in this example, both the blue and the green color channels.

In the depicted process flow, a sub-region of the image may be selected (step 458) or identified for use in the subsequent processing steps to generate a focus quality metric for the processed sub-region. By way of example, a line or row of pixels or a 256×256 pixel, 512×512 pixel, 1024×1024 pixel, and so forth pixel region or window may be selected for processing. It may also be appreciated that, depending on the dimensions of the image, the image may itself be processed instead of a sub-region. In practice, the image (e.g., a not-fully resolved image) and image sub-region comprises individual pixels, each having a spatial location and an associated gray-scale or color intensity value (e.g., a red, green, or blue intensity value depending on the color channel associated with the image). In the depicted process flow, the image sub-region is provided as an input to a Fourier transformation (e.g., a discrete Fourier transform (DFT)) at step 466, which outputs the corresponding Fourier transform of the image sub-region.

Figure 9:
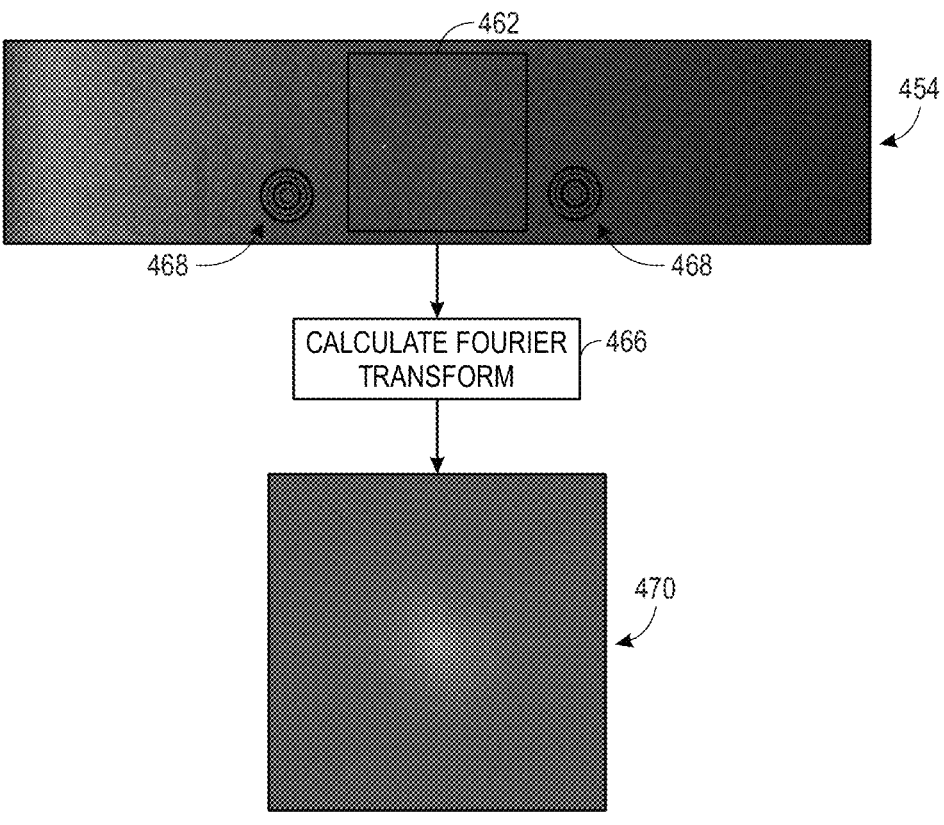
FIG. 9 visually illustrates a Fourier transform derived from an image, in accordance with the present disclosure.
Figure 10:
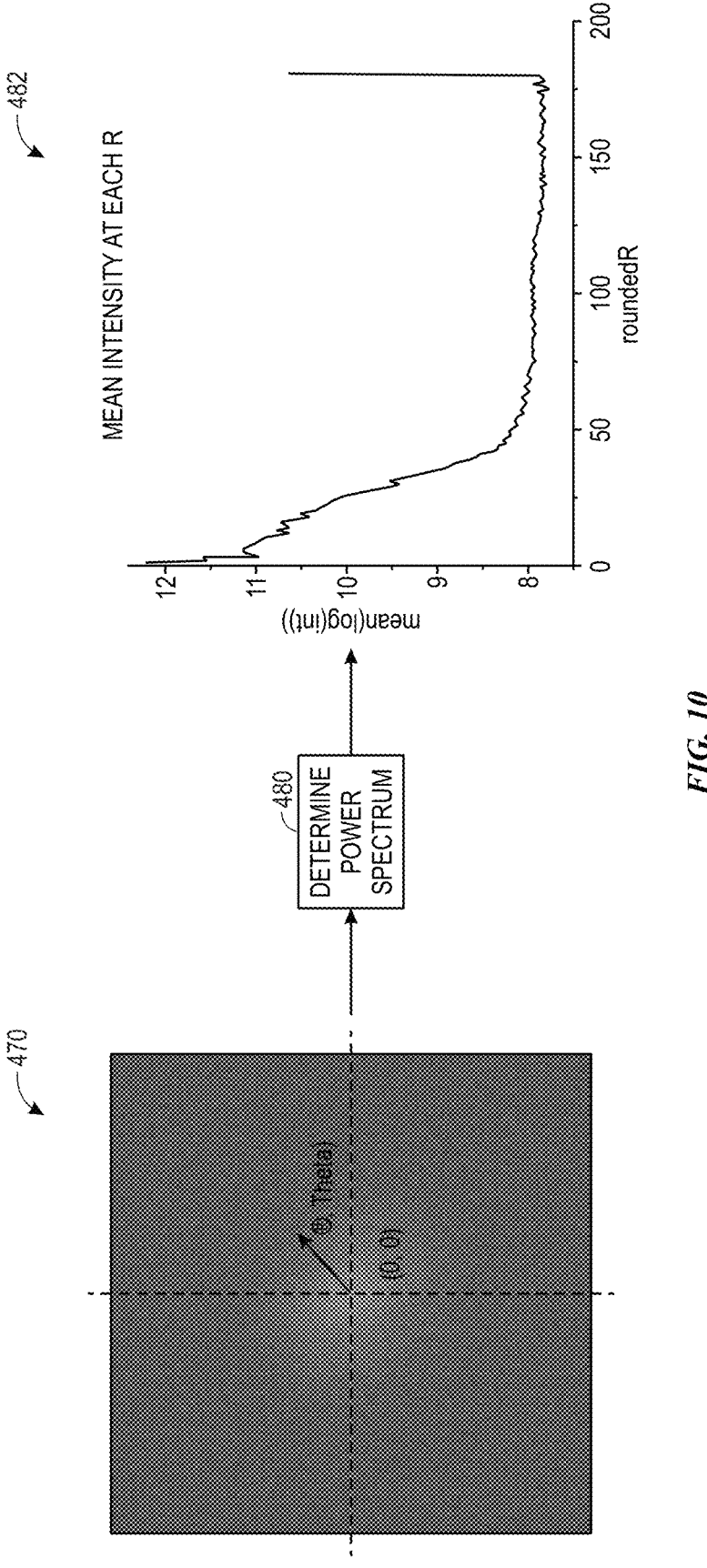
FIG. 10 visually illustrates a power spectrum derived from a Fourier transform, in accordance with the present disclosure.

This step is graphically depicted in FIG. 9, in which an image 454 (e.g., a fluorescence image) of a portion of flow cell (e.g., an image tile 294 or pixel line) is depicted from which a sub-region 462 of the image 454 is selected for processing. In the depicted example, the sub-region 462 may be localized or otherwise identified using one or more fiducials 468 (e.g., bullseye fiducials) so the same sub-regions 462 may be selected for processing in a sequence or series of imaging runs.

A discrete Fourier transform operation is performed (step 466) on the data within the image sub-region 462 (i.e., the spatial location and intensity data corresponding to the image sub-region 462). The resulting Fourier transform 470 (and corresponding power spectral density) is output at this step. As noted herein, the given image 454 and sub-region 462 may be for a given gray-scale intensity or for a given color channel (e.g., red, green, or blue) in a multi-channel imaging context, and the corresponding transform may therefore relate to a given color or to an overall gray-scale image and the corresponding pattern of active/inactive sample wells for the respective excitation frequency.

Turning back to FIG. 8, the mean (or median) radial intensities (measured from the center of the Fourier transform 470) may be calculated (step 474), which provides a measure of how rapidly magnitude decreases with distance. The power spectrum may be determined (step 480) from the radial mean (or median) intensities. This is graphically illustrated in FIG. 10, in which the output of a Fourier transform is illustrated from which radial mean intensities are determined (step 480) and used in the calculation of a power spectrum 482 in which integrated power is plotted for each r.

Figure 11:
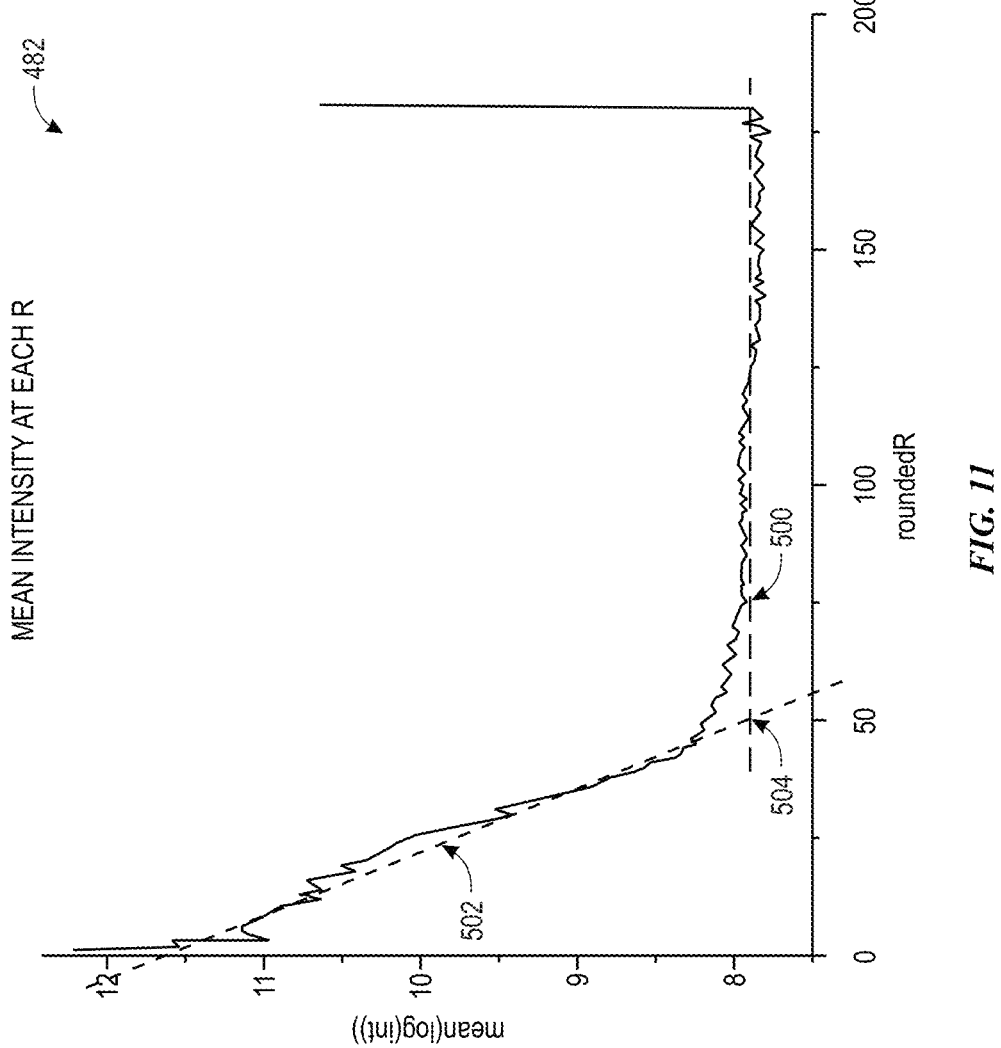
FIG. 11 visually illustrates a piecewise function fit to a power spectrum visually illustrates a Fourier transform derived from an image, in accordance with the present disclosure.

Several parameters of the power spectrum 482 are then calculated, each providing useful information, including a quantitative metric corresponding to focus quality. By way of example, and turning to FIG. 8, one or more of a radial slope, corner frequency, and/or noise floor are derived (step 484) from the power spectrum 482. By way of example, in one implementation, and as illustrated in FIG. 11, a piece-wise function (e.g., comprising two or more separately fit segments) may be fit to the power spectrum 482. Various metrics of the piece-wise function can then be determined that correspond to the radial slope, corner frequency, and/or noise floor.

By way of example, and as shown in FIG. 11, a piece-wise function may be fitted to the power spectrum 482 using a least squares fit approach or other suitable fitting approach. In the depicted example, the piece-wise function includes two linear segments. A fitted horizontal segment 500 corresponds to the noise floor, below which no information is obtained and where the measured signal corresponds to electronic or other noise. The y-intercept of the segment 500 gives the value of the noise floor.

Another segment 502 intersects the noise floor segment 500 at an angle and corresponds to the non-noise, useful signal. The slope of the segment 502 is the radial slope and is dependent on the quality of focus such that the measure of the radial slope provides quantitative metric for focus quality. That is, in the present context, the slope of the segment 502 comprises a focus quality metric by which the focus of the input image sub-region 462 corresponding to the power spectrum 482 may be evaluated and/or compared to other sub-regions 462. As previously noted, other approaches assume a Gaussian distribution profile for the point spread function as it pertains to the radial slope. Such an assumption is not made in the presently disclosed approach however. Indeed, in certain embodiments a Lorentzian distribution profile for the point spread function, and the corresponding implications on the radial slope, may instead be suitable.

The intersection 504 of the segments 500 and 502 occurs at a corner frequency, which corresponds to the maximum spatial frequency for which focus information was determined and which may provide useful diagnostic information. Other metrics that may be of interest and that may be calculated include the highest frequency above the noise floor for which values were observed, which provides information about the observed signal intensity range observed, and the goodness of fit of one or both of segments 500 and 502, which may provide information about the quality or reliability of the respective metric(s) in question by quantifying the extent to which the variability in the measured data is accounted for by the model fitted function.

In a nucleic acid sequencing context use of the slope as a focus quality metric is substantially insensitive to variation in signal intensity (e.g., variations in fluorophore intensity) on a patterned surface, such as between image tiles at different locations on the patterned surface. Correspondingly, the use of slope as a focus quality metric is robust to normal variability observed in the context of grafting and template hybridization processes associated with nucleic acid sequencing operations as well as to non-uniformities associated with excitation intensity in such operations. Further, because the presently disclosed approach relies on the periodic information generated from thousands to tens of thousands of fluorescent emitters in the field-of-view, the focus quality metric is also insensitive to normal non-uniformities observed in images acquired in a sequencing operation. In addition, generation and use of a focus quality metric as presently described also provides additional diagnostic data on the point spread function (PSF) of the optical imaging system used to generate the image data. As noted herein, the presently described approach to focus quality metrics does not assume a Gaussian profile for the optical PSF, which makes this approach more flexible than conventional approaches that do require such an assumption. Lastly, detailed information on sample plane tilt may also be derived as values of the focus quality metric at different locations on the patterned surface may be used to determine the actual focal plane at different locations, and hence identify tilt of the sample surface.

With the preceding in mind, experiments were performed to evaluate the focus quality metric as described herein. In a first experimental setup, a stack of images acquired at varying heights along the z-dimension of a flow cell surface were acquired. In this setup, the stack of images in the z-dimension were acquired of an auto-centering cross fiducial provided on a flow cell surface and using two color channels (blue and green). Images were acquired in the z-dimension at 0.1 μm increments. In an additional aspect, once the focal plane height was determined that optimized focus, the height in the z-dimension was fixed and images were also acquired at this optimal focal height while the excitation laser power and exposure were titrated over the fiducial. For all images a 256 pixel×256 pixel region centered on the auto-centering cross fiducial was cropped and analyzed for focus quality.

Figure 12A:
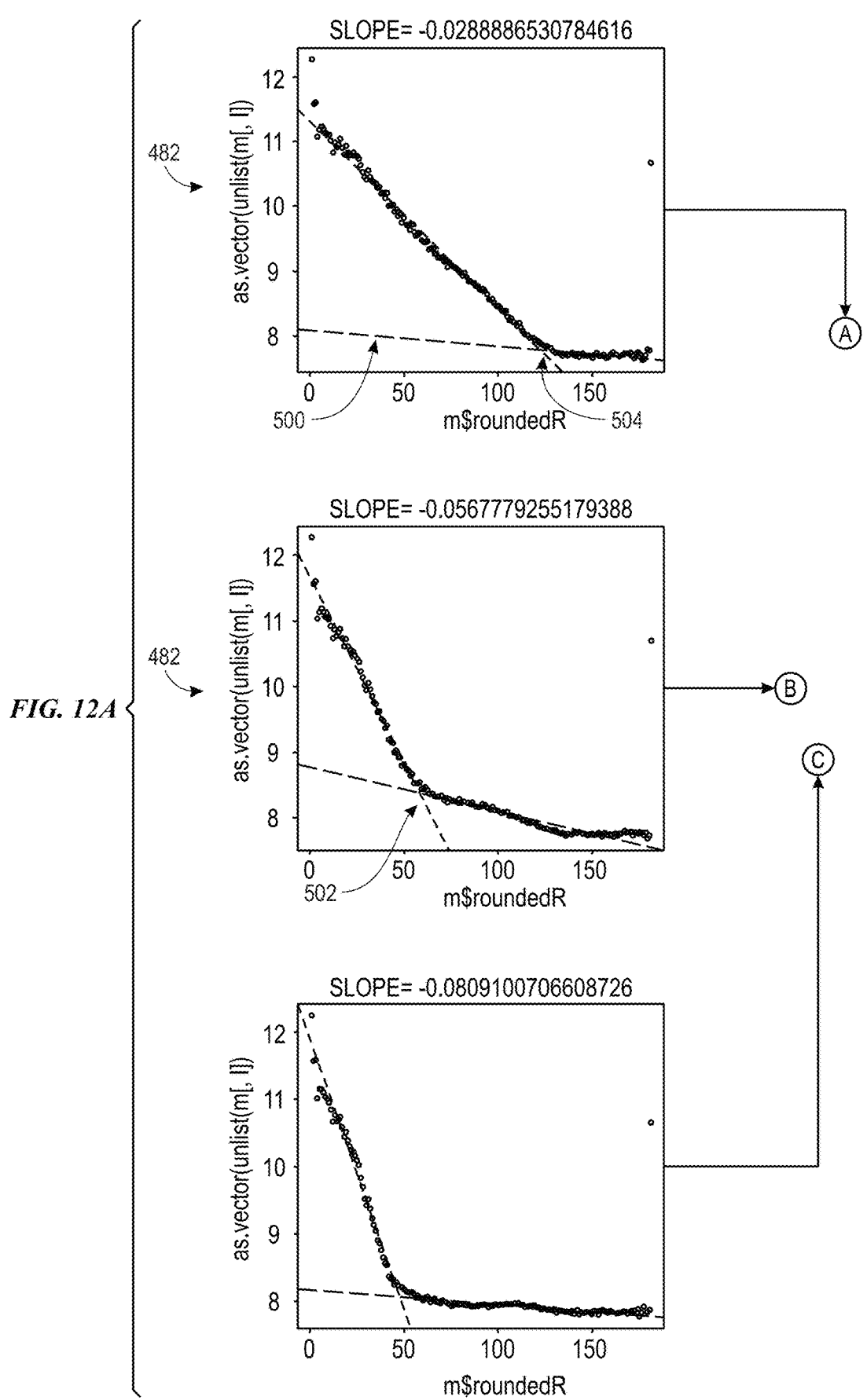
FIGS. 12A, 12B, and 12C visually illustrates the fit of piecewise functions to power spectra derived for respective images of a z-stack of images, in accordance with the present disclosure.
Figure 12B:
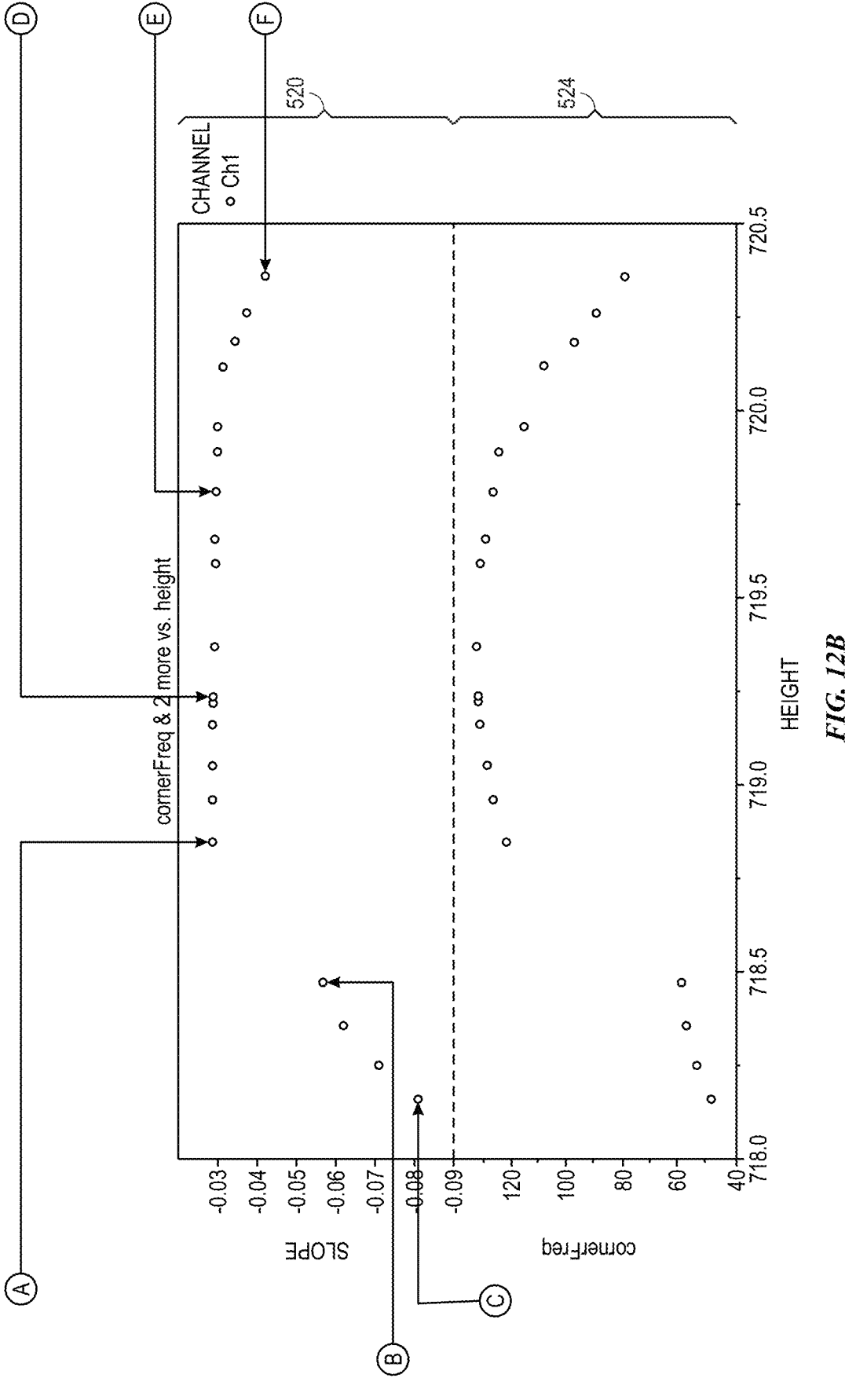
Figure 12C:
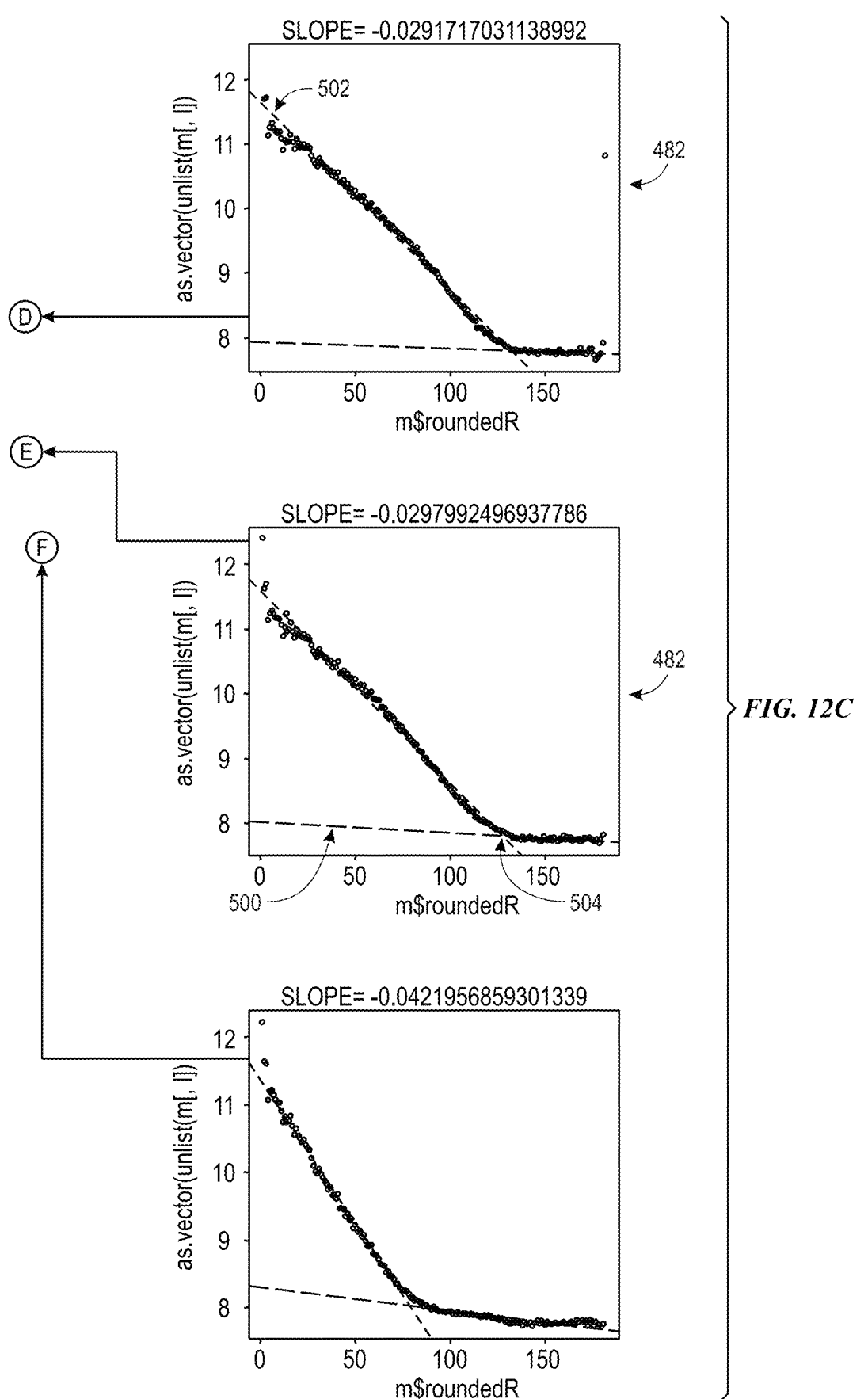
Figure 13A:
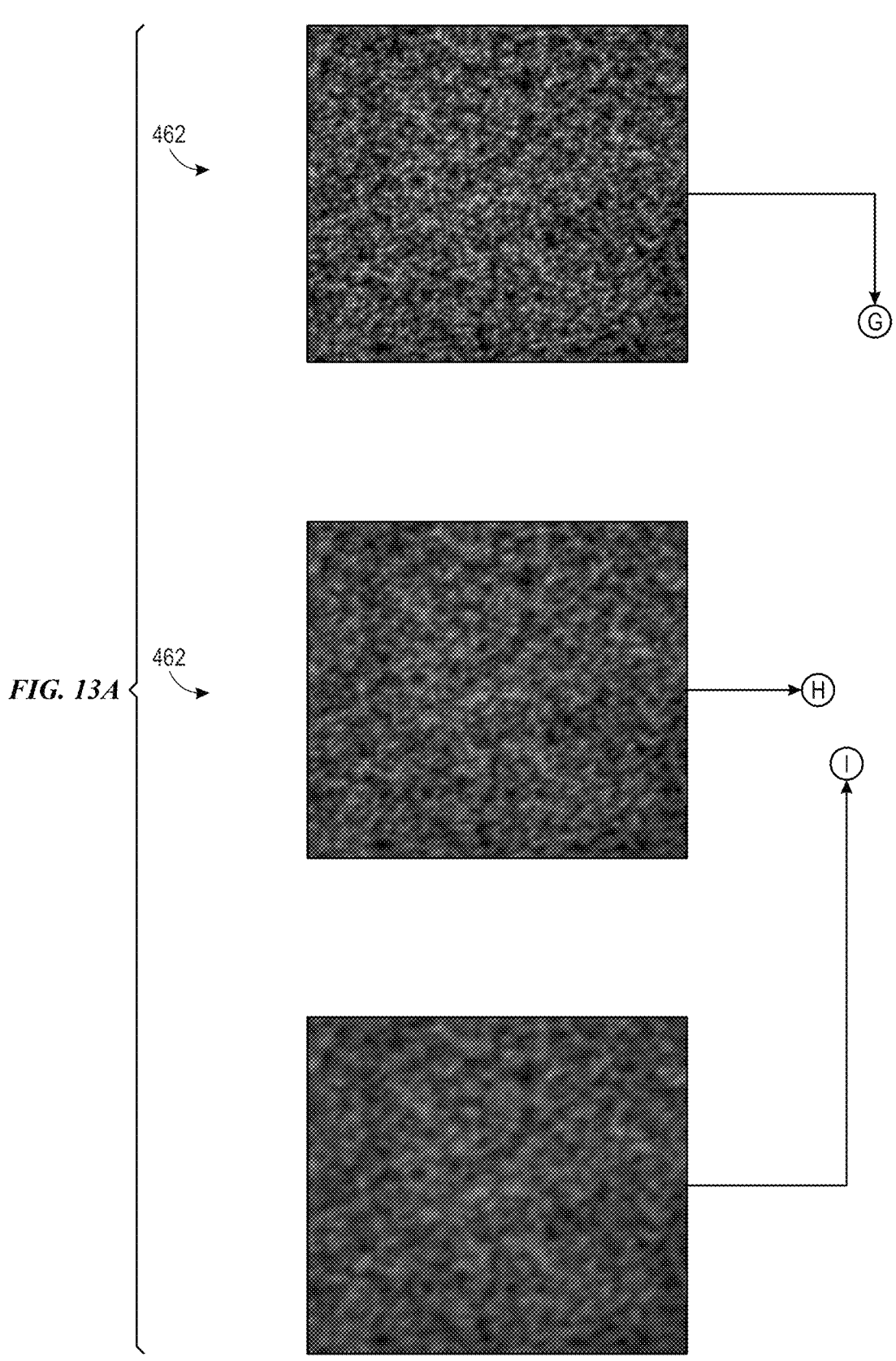
FIGS. 13A, 13B, and 13C depicts the corresponding image data for the power spectra illustrated in FIGS. 12A-12C.
Figure 13B:
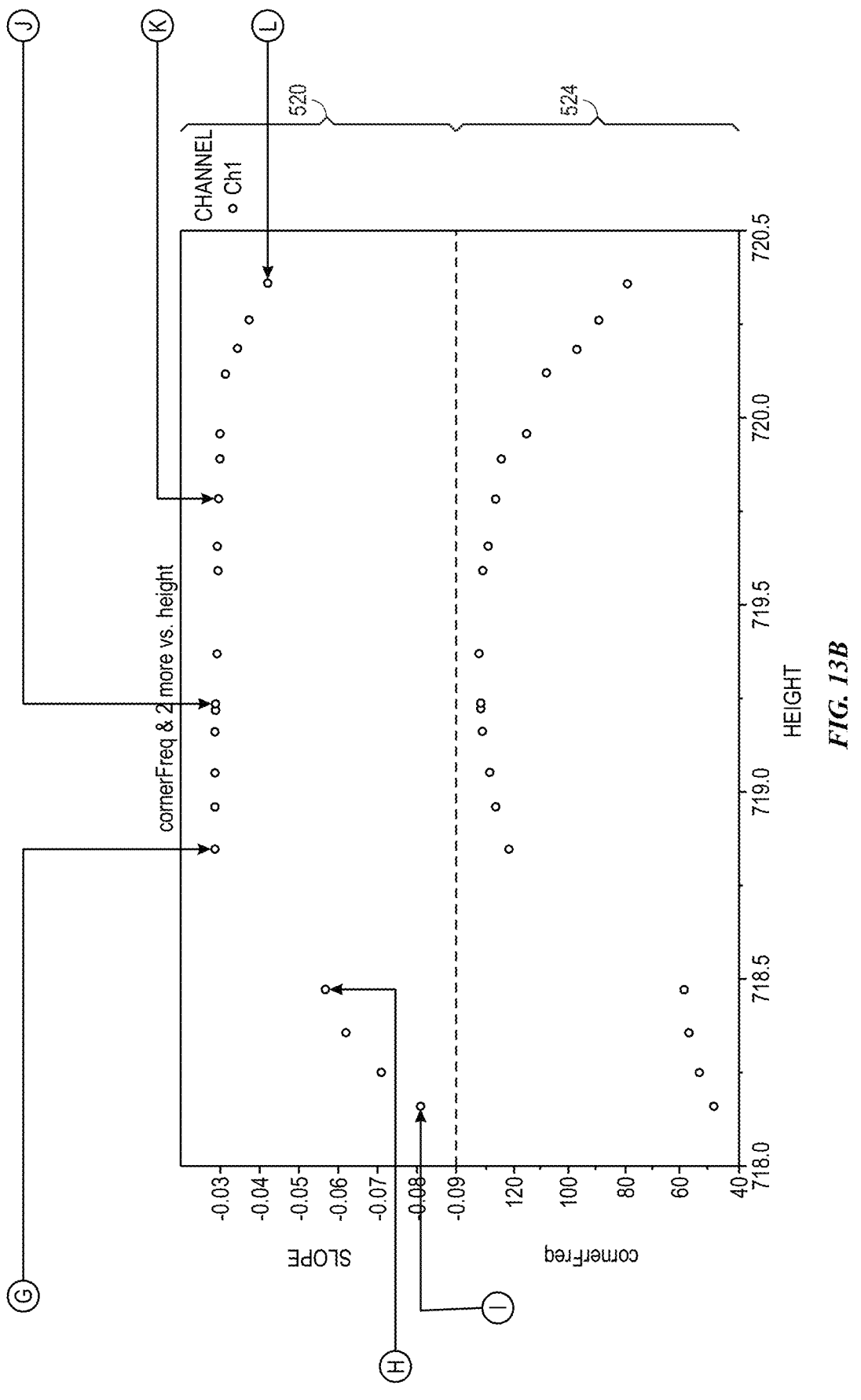
Figure 13C:
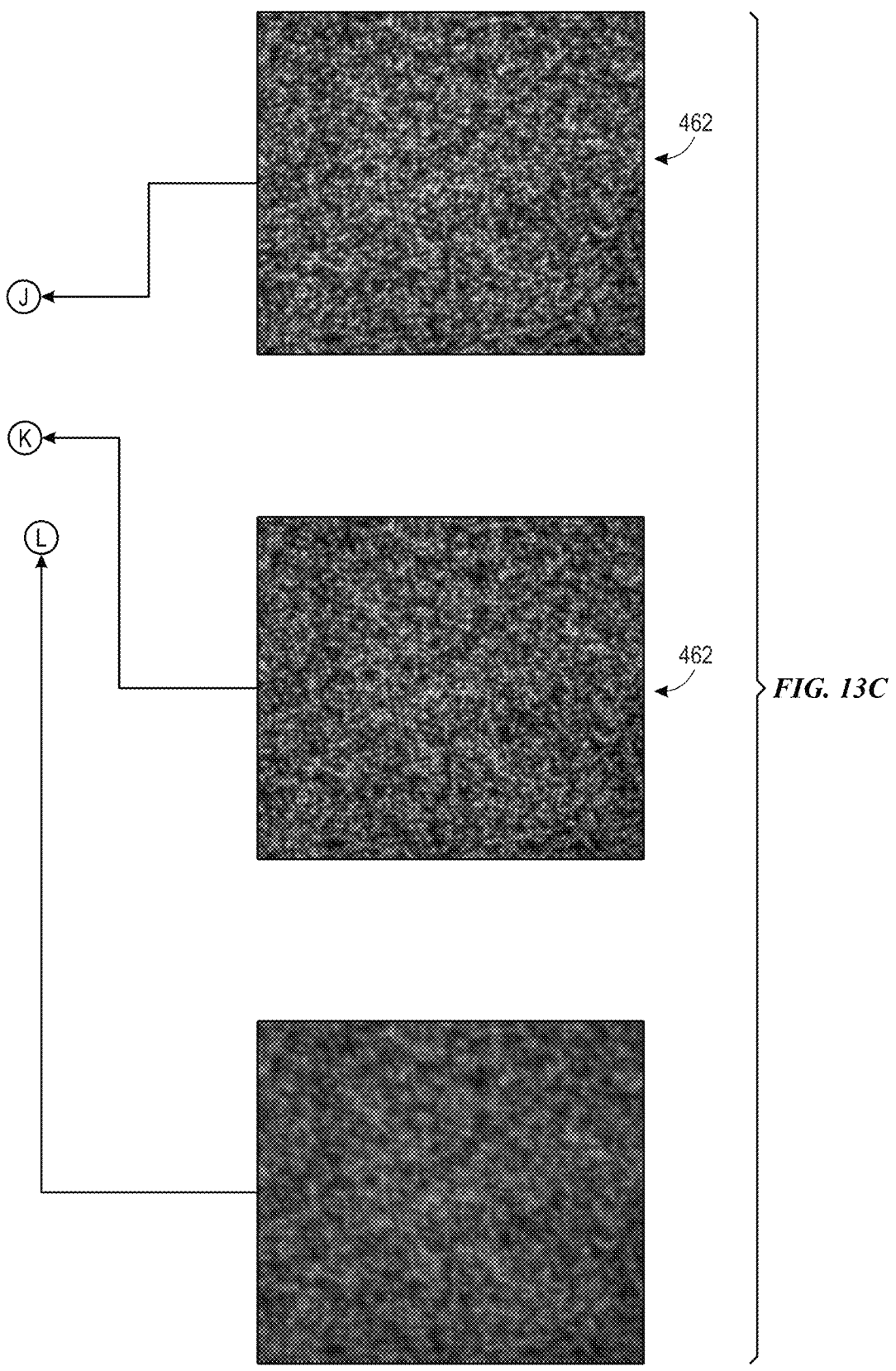

Turning to FIGS. 12A-12C and 13A-13C, a series of piece-wise functions obtained for images acquired at different heights within a z-stack of images is depicted in conjunction with respective plots of radial slope (upper plot 520) and corner frequency (lower plot 524). For corresponding image sub-region images 462 at different heights in the z-dimension, Fourier transforms and respective power spectra 482 were calculated and the respective radial slopes and corner frequencies determined. In the depicted examples, FIGS. 12A, 12B, and 12C depict representative plots of the respective power spectra, radial slopes (with respect to line segments 502), and corner frequencies 504 for six different sub-region images 462 acquired at different heights in the z-dimension while FIGS. 13A, 13B, and 13C depicts the corresponding image sub-regions 462 for which the radial slopes and corner frequencies were calculated. The depicted power spectra and plots 520 and 524 were for a single color channel (the blue color channel) in the depicted example.

As shown in FIGS. 12A, 12B, and 12C, image data acquired at higher and lower elevations in the z-stack have steeper slopes, which correspond to lower slope values (due to the negativity of the slopes) and poorer focus quality. Conversely, higher slope values are associated with superior focus quality, here observed for image data acquired toward the middle of the z-stack of images. FIGS. 13A, 13B, and 13C depict the sub-region image data corresponding to the respective power spectra 482 and radial slopes of FIGS. 12A-12C. As noted previously corner frequency (shown in the lower plot over the range of heights in the z-stack of images) corresponds to the maximum spatial frequency for which focus information was determined and which may provide useful diagnostic information.

While FIGS. 12A-12C and 13A-13C illustrate results for images acquired on a single color channel (e.g., a blue color channel) in practice it may be desirable to calculate a focus quality metric for each color channel employed in an imaging operation (e.g., blue, green, red, and so forth). An intermediate or "compromise" focus height can then be determined that provides adequate focus for each color channel, allowing the same focus height to be used when imaging both color channels. Such an approach may save computational and system time and resources by allowing a single focus height to be employed for multiple color channels.

Figure 14:
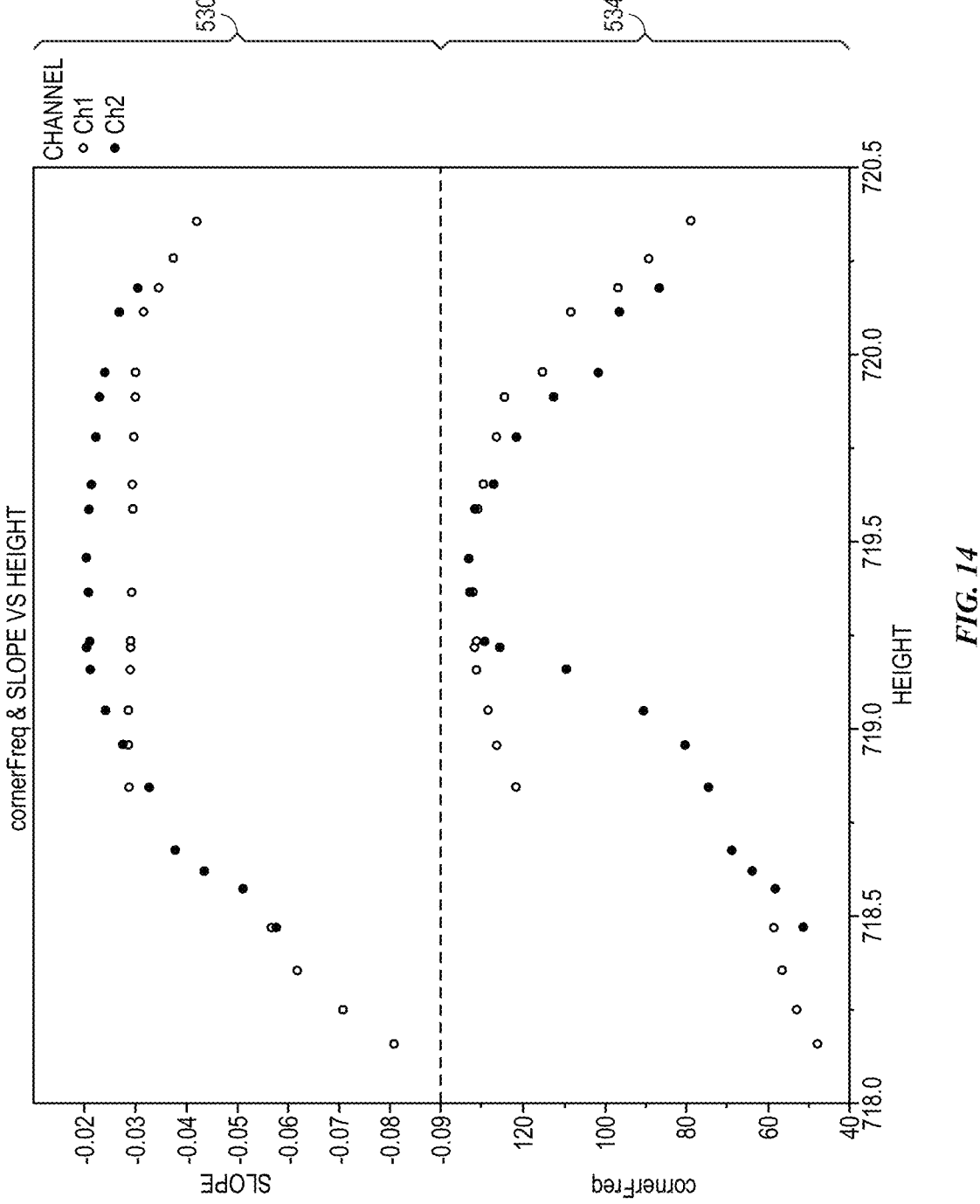
FIG. 14 graphically depicts plots of radial slope and corner frequency plotted against z-height for two different color channels, in accordance with the present disclosure.

By way of example, turning to FIG. 14 radial slope and corner frequency results for the z-stack of images acquired in the described experimental setup are shown plotted together for both blue and green color channels. Radial slope for the z-stack of images for blue and green channels is shown plotted in the upper plot 530, while corner frequency for the z-stack of images for blue and green channels is shown plotted in the lower plot 534. As shown in this example, for the blue and green color channels, both radial slope and corner frequency trend with height (e.g., are correlated with or otherwise relatable to height in the z-dimension) as previously described. With respect to radial slope, both the blue and green channels appear to have local optima for focus quality at similar heights in the z-dimension (i.e., at or between about −0.02 and −0.03). Accordingly, based on time or computational constraints, focus height for an imaging operation may be established or verified by evaluating focus quality metrics for two or more color channels and determining a focus height that provides sufficient focus quality for all color channels. Conversely, in the absence of time or computational constraints and/or if it is determined that separately optimized focus for each color channel is needed, focus quality metrics (i.e., radial slope) may be separately and independently calculated for each color channel to determine an optimal focus height for each channel.

Figure 15:
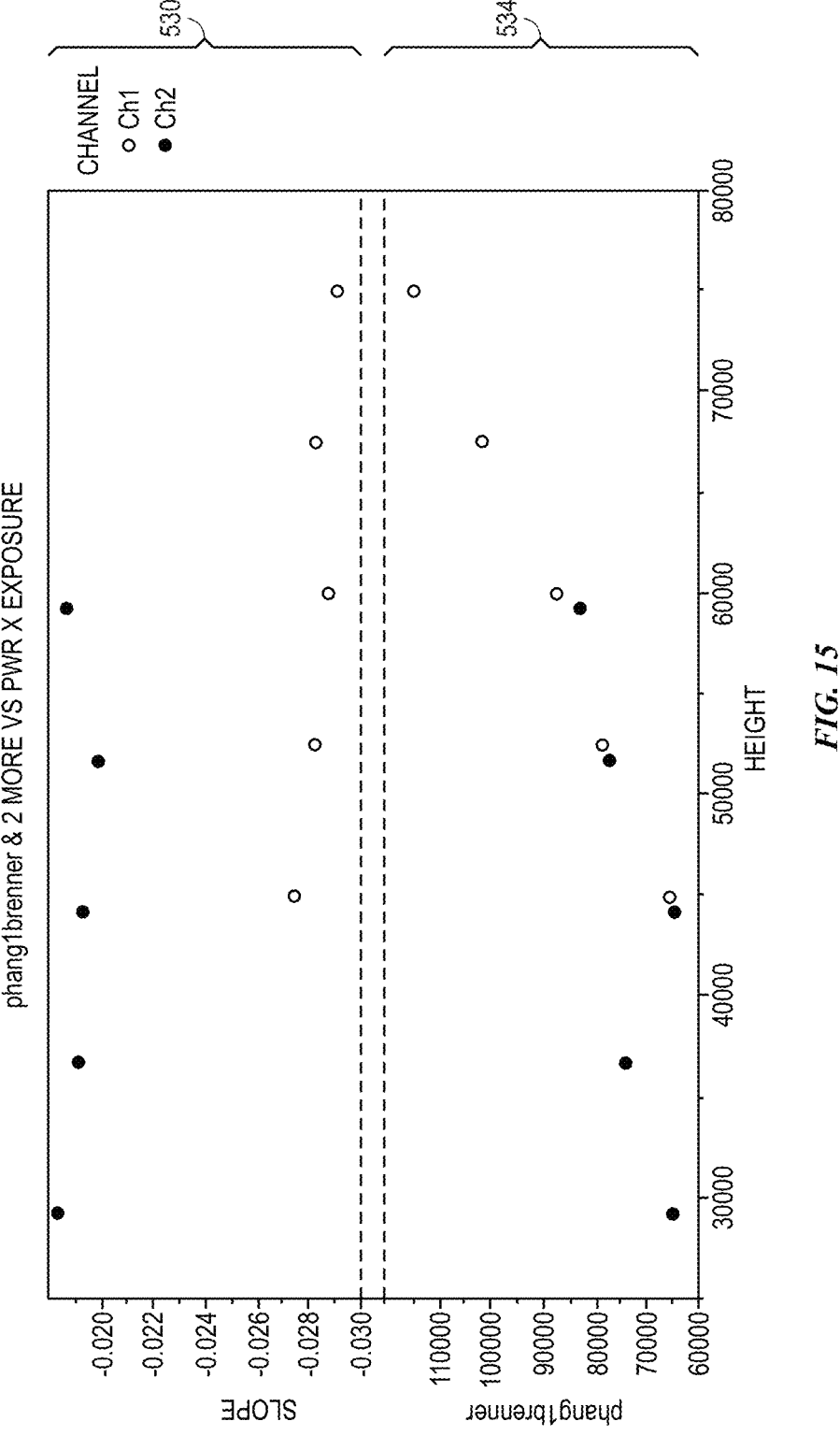
FIG. 15 graphically depicts plots of radial slope and Brenner scores determined for a fixed focal height and over a range of intensity values.

With respect to the performance of the presently disclosed focus quality metric (i.e., radial slope) relative to conventional approaches, FIG. 15 depicts plots of focus quality measures in the form of Brenner scores (bottom plot 560) for image data for which radial slopes as discussed herein are also calculated as a slope quality metric (upper plot 564). With respect to these plots, the image data acquired for which focus quality was assessed was acquired for both green and blue channels and at a fixed height in the z-dimension determined to be the optimal focus height. Excitation laser power and exposure were titrated and images acquired at different values of "laser power×exposure". In this experimental set-up, therefore, pixel intensities varied between images despite being at the same fixed z-value and of the same sub-region in each image.

As noted herein, Brenner scores are intensity dependent, and therefore fluctuate based on intensity or variations of intensity within the underlying image. Correspondingly, and as shown in the bottom plot 560, the Brenner scores observed on both the blue and green channels vary widely despite the respective images all being acquired at the same height in the z-dimension (i.e., at the same focus).

Conversely, as shown in upper plot 564, the radial slopes derived from and plotted for both the green and blue channels are substantially intensity independent, demonstrating little variation over the range of "laser power× exposure" sampled. That is, focal slope as a focus quality metric demonstrates relatively little variation as pixel intensity changes for image data acquired at a fixed height in the z-dimension.

Figure 16:
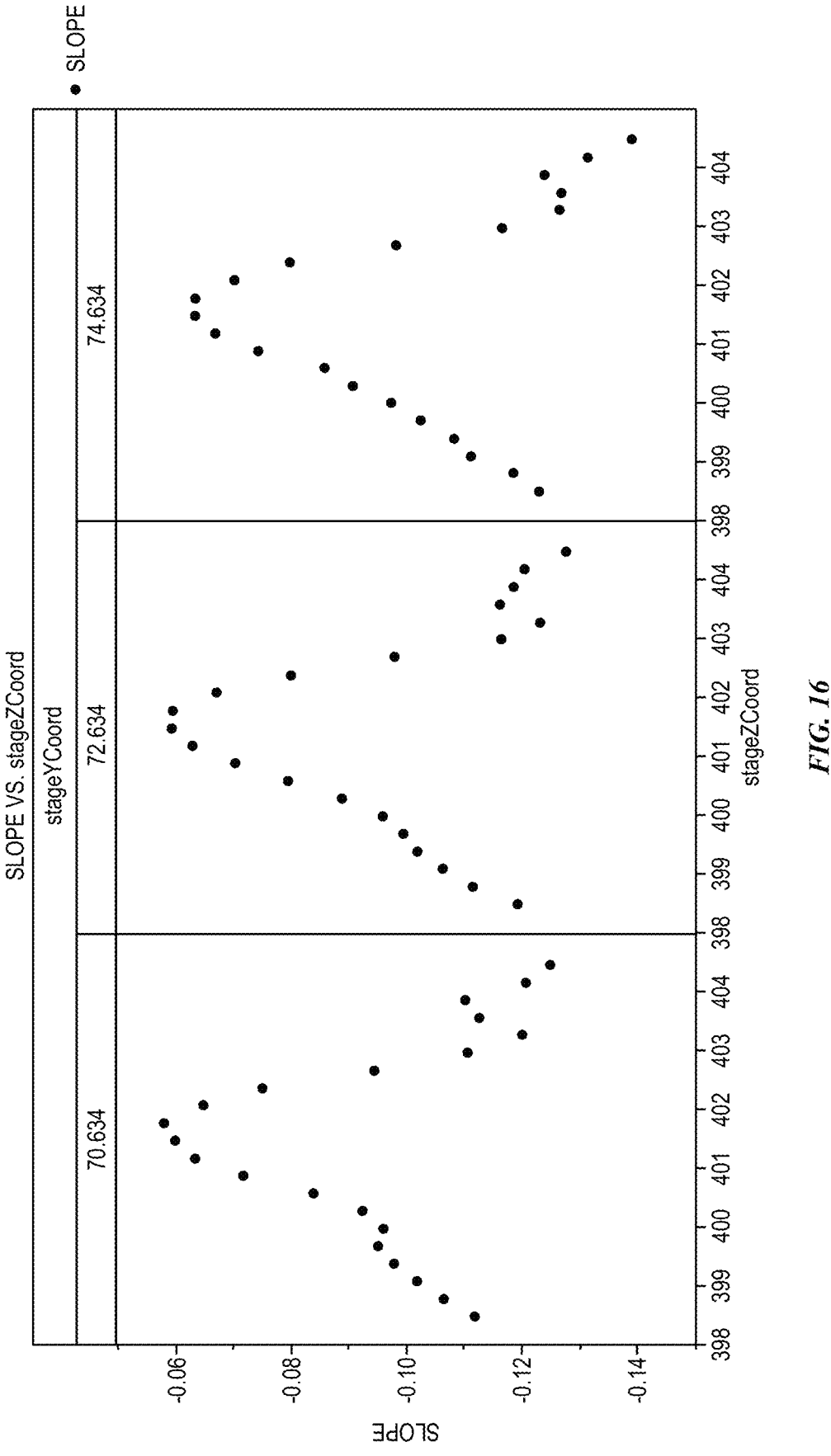
FIG. 16 graphically depicts plots of radial slope over a range of z- and y-dimension values, in accordance with the present disclosure.

Similarly, turning to FIG. 16, experimental results are illustrated showing that radial slope does vary with height in the z-dimension, confirming that radial slope corresponds to focus quality. As shown, no non-local maxima are evident. Further, for the flow cell imaged, the slope profiles remain similar at different y-coordinates, i.e., the focal height identified by this approach appears to be suitable for other locations on the patterned surface. As a result, a calibration curve based on plots of the type shown may be used to determine how far from optimal focus different locations on an image are.

Figure 17:
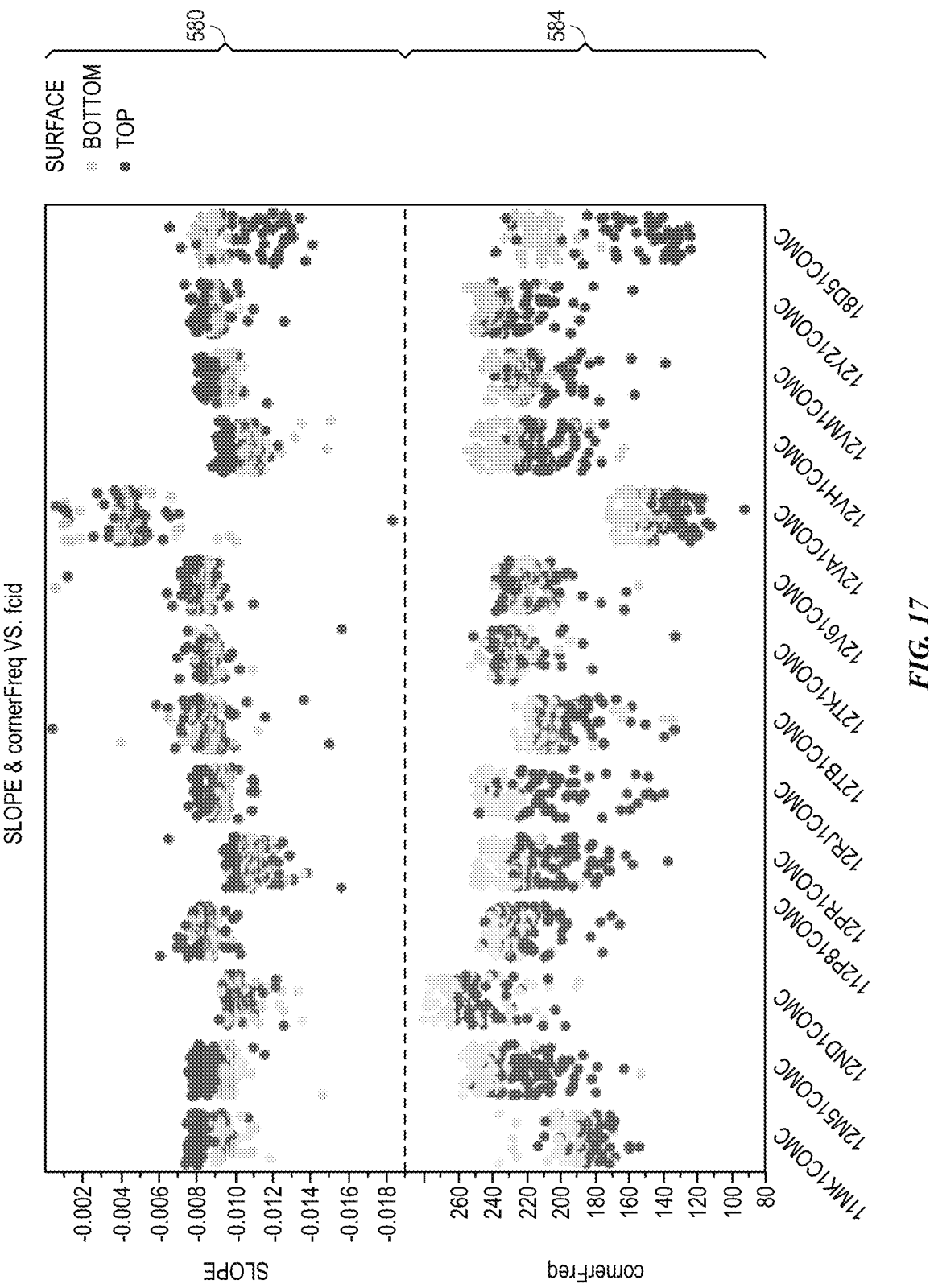
FIG. 17 graphically depicts plots of radial slope and corner frequency determined for different flow cells, in accordance with the present disclosure.

In a similar context, and by way of further experimental data, multiple flow cells were imaged using a respective sequencer system. For respective sub-region image areas radial slopes and corner frequencies were calculated. Turning to FIG. 17, the respective radial slope and corner frequency values were plotted (upper plot 580 and lower plot 584 respectively) for each flow cell, with flow cell identifiers (FCID) along the bottom of the plots. As shown, for the respective sequencer device, the radial slopes were substantially constant across flow cells, which is expected since radial slope and focus quality may be instrument dependent, such that the same instrument should have the same focus characteristics between sequence runs. It may be noted that one outlier, corresponding to flow cell identifier 12VA1COMC, is depicted. In the sequencing run corresponding to this outlier the flow cell was imaged out-of-focus so as to demonstrate the corresponding effect on radial slope.

Figure 18:
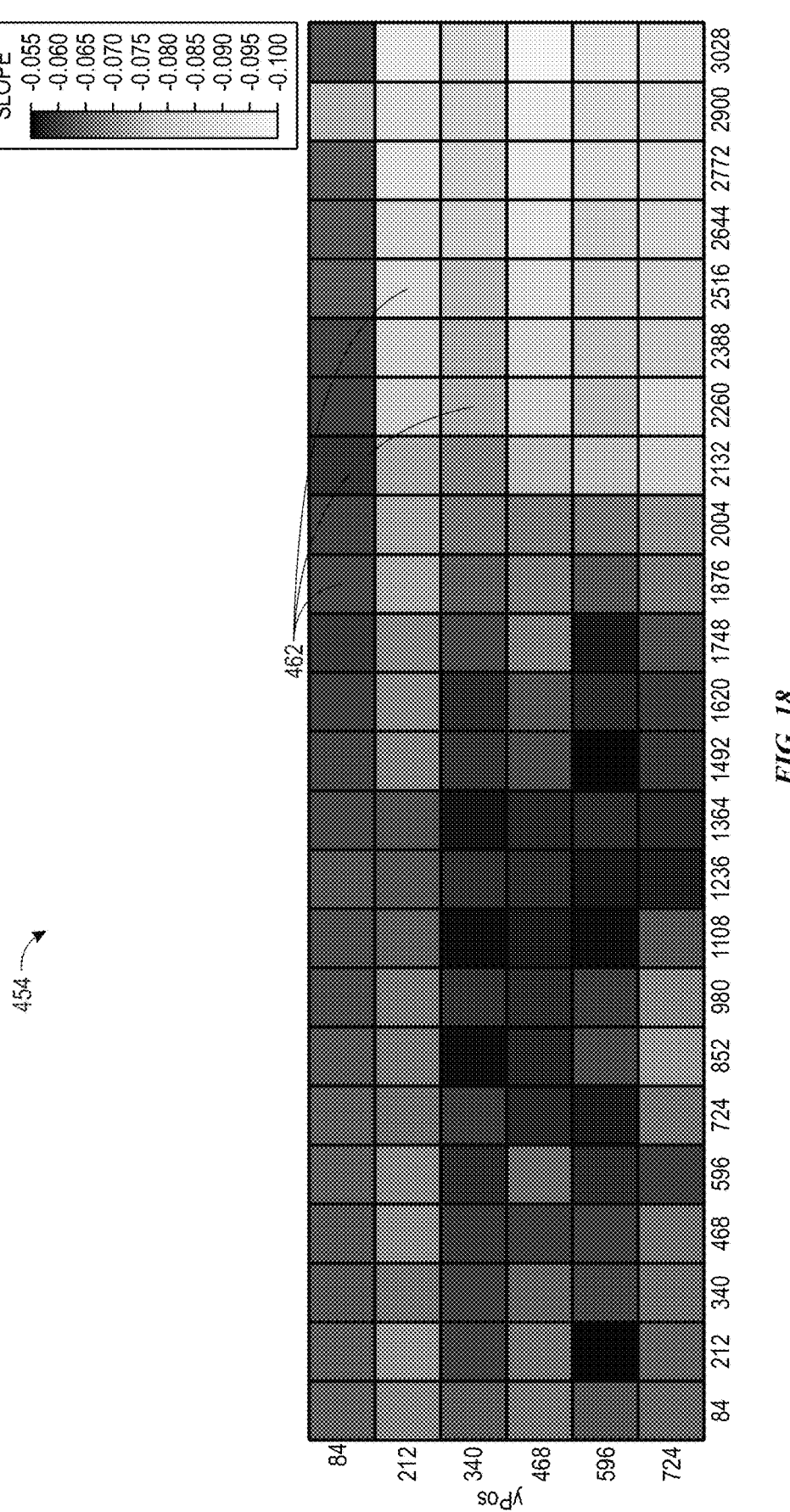
FIG. 18 graphically depicts a visually-coded representation of slope plotted for different sub-regions of an image, in accordance with the present disclosure.

As previously noted herein, among other information that may be derived using focus quality metrics as discussed herein is the change or consistency of focus height over an entire surface (e.g., patterned surface of a flow cell) or for a region or portion of such a surface. In practice, this may equate to the presence or absence of a "tilt" or other irregularity to the surface or stage corresponding to a discrepancy between the focal plane and sample plane. By way of example, and turning to FIG. 18, a representation corresponding to an image 454 is depicted. In this example, the image 454 was split into sub-regions 462 (i.e., sub-tiles, here having dimensions of 128 pixels×128 pixels), each of which was processed as discussed herein to calculate a radial slope for the sub-region 462. FIG. 18 depicts a representation of the sub-regions 462 arranged according to their positions in the x-, and y-dimensions and visually coded to correspond to their calculated radial slope values. As shown, the calculated radial slopes may vary across the imaged surface in a systematic manner, which may indicate a tilt to the slide or stage. Such a tilt may be addressed during a subsequent sequencing run by appropriate changes to focus height.

It may be noted that the assessment of focus quality as discussed above may be further generalized. In particular, the preceding discussion generally assumes radial symmetry of the Fourier transform 470. Such radial symmetry, when present or assumed, allows the Fourier transform 470 to be fit in one-dimension (e.g., the z-dimension), as discussed above. However, such radial symmetry may be a special case scenario or may be assumed if the Fourier transform is substantially close to radially symmetric.

Figure 19:
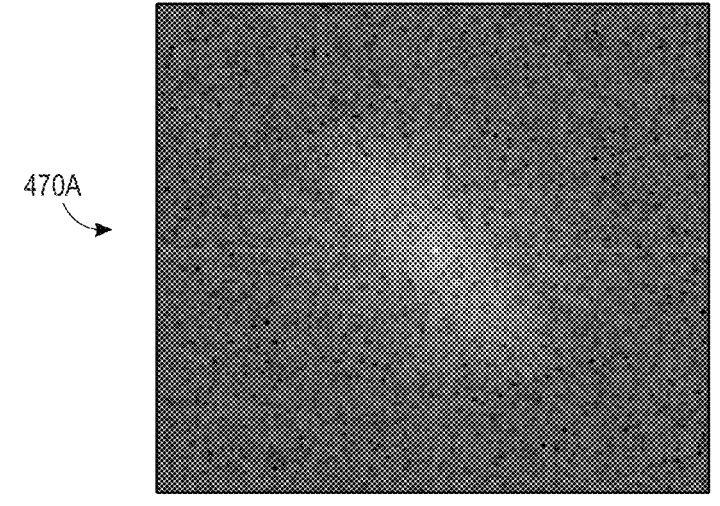
FIG. 19 depicts a radially asymmetric Fourier transform and corresponding power spectrum, in accordance with the present disclosure.
Figure 19:
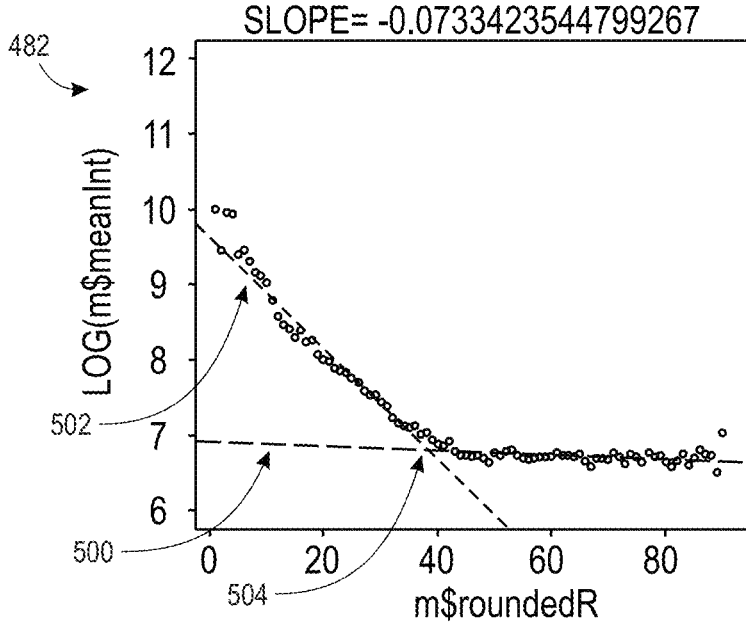

In a more generalized context the Fourier transform 470 may be elongated along the diagonal (e.g., may not exhibit radial symmetry) and may be characterized as "astigmatic". An example of this is illustrated in FIG. 19, in which a radially asymmetric Fourier transform 470A is depicted in conjunction with the corresponding power spectrum 482. Such radial asymmetry may be indicative that focus in one dimension (e.g., the x-dimension) is different than focus in a different dimension (e.g., the y-dimension). In such a scenario, it may be useful to analyze or quantify focus in the two-dimensions to obtain additional focus information. That is, the Fourier transform 470 may be fit in two-dimensions to more fully characterize focus in the absence of radial symmetry of the Fourier transform 470.

While the preceding discussion relates aspects of calculating focus quality metrics based on a sub-region of an acquired image based off of a Fourier transform of the sub-region image data, the following examples relate to a further aspect of this approach in which the sub-region is a linear sub-region (e.g., a row of pixels) within the image. While the following examples and embodiments fall within the scope of the preceding discussion, certain aspects may be omitted or modified due to the benefits of performing a one-dimensional (1D) Fourier transform (e.g., a fast Fourier transform (FFT)) on the line data as opposed to a two-dimensional (2D) Fourier transform on an area of image data. By way of example, in the context of calculating a focus quality metric based on an area sub-region of the image, and as described herein, the steps performed may include selecting a sub-region of the image for processing, performing a 2D FFT on the sub-region of image data, determining a radial average based on the Fourier transform, determining a power spectrum based on the radial average, fitting a piece-wise function to the power spectrum, and determining a slope of a relevant segment of the piece-wise function, where the slope corresponds to the focus quality metric of interest. Conversely, in the examples discussed below, the sub-region of the image on which the Fourier transform is performed is a linear segment, e.g., a row of pixels such that the Fourier transform can be a 1D Fourier transform (e.g., FFT). Such a 1D Fourier transform may be implemented in firmware or hardware (such as using field programmable gate arrays (FPGA), application specific integrated circuits (ASIC), programmable logic devices (PLD), complex programmable logic devices (CPLD), a programmable logic array (PLA), programmable array logic (PAL), or other similar processing device or circuitry) for improved computational efficiency and system performance.

Figure 20:
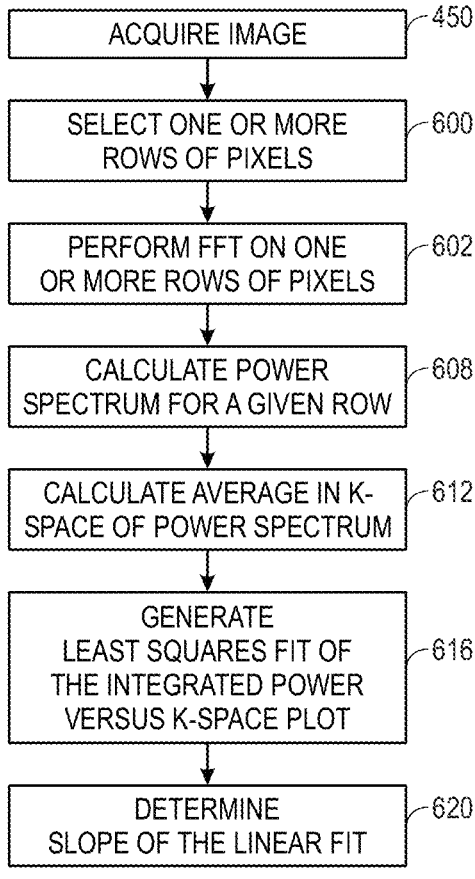
FIG. 20 depicts a process flow illustrating steps in the generation of a focus quality metric using row data, in accordance with the present disclosure.

By way of example, and turning to FIG. 20, a generalized process flow of steps that may be employed in the generation of a focus quality metric based one or more rows of pixels is depicted. Turning to FIG. 20, the depicted process starts with the acquisition (step 450) of an image, such as an image of a flow cell or other sample binding or containing surface.

By way of example, the image may, in part or in whole, correspond to an image of a patterned surface 288, a grid or swath 290 of such a surface, an image tile 294 within such a swath 290, or a sub-tile selected from a larger tile 294 within an image. Further, the image may be composed of a single shot or acquisition of the imaged region or as a time-delay integration performed line-by-line or may be constructed via a combinatorial process, such as to combine multi-phase acquisitions into a single image for processing, such as via averaging across the multi-phase acquisitions to generate the image.

As previously noted, in the context of a nucleic acid sequencing operation, each region of the patterned surface may be imaged more than once (i.e., once for each color channel, such as blue and green), with different sample sites being "on" or "off" in a given imaging cycle based upon the light frequency used to generate the respective image. As a result, there may be more than one image of each region, with each image corresponding to a different color or intensity channel and having different sample sites active or not active. In practice, each color channel may have a separate optimal focus. With this in mind, and with respect to the present technique, focus quality metrics may be generated for images derived for only one color channel (e.g., the blue channel or the green channel), such as for a color channel determined to be sufficient for maintaining focus of the system. Alternatively, focus quality metrics may be generated for two or more of the color channels separately (e.g., blue channel focus metrics and green channel focus metrics) and an intermediary focus height determined that is acceptable for the imaging using each color channels. In this manner, a single focus height may be determined that may be used for acquisition of images using, in this example, both the blue and the green color channels.

In the depicted process flow, a row of pixels (or a portion of such a row) of the image may be selected (step 600) or otherwise identified for use in the subsequent processing steps to generate a focus quality metric relevant to that row or that row in combination with other rows with which the row is averaged or otherwise combined. By way of example, a line or row of pixels of a given width (e.g., 128 pixels, 256 pixels, 512 pixels, 1024 pixels, 2048, pixels, and so forth) may be selected or identified for processing. In practice, each row of pixels so selected or identified comprises individual pixels, each having a spatial location and an associated gray-scale or color intensity value (e.g., a red, green, or blue intensity value depending on the color channel associated with the image). In the depicted process flow, a selected row of pixels is provided as an input to a one-dimensional (1D) Fourier transformation (e.g., a 1D fast Fourier transform (FFT)) at step 602, which outputs the corresponding Fourier transform of the row of pixels.

Figure 21:
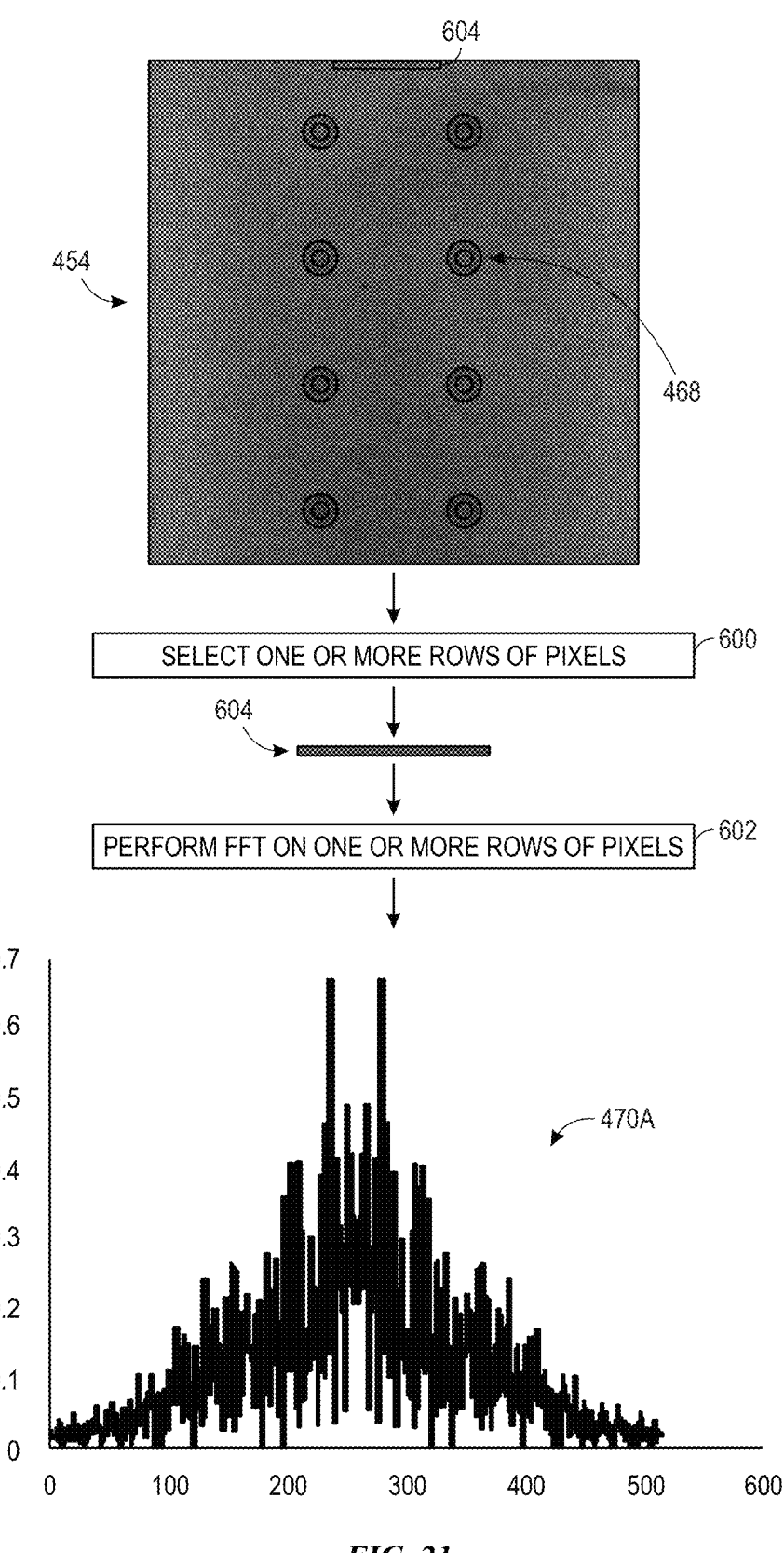
FIG. 21 visually illustrates a one-dimensional Fourier transform derived from an image, in accordance with the present disclosure.

These steps are graphically depicted in FIG. 21, in which an image 454 (e.g., a fluorescence image) of a portion of flow cell is depicted from which a row 604 of pixels of the image 454 is selected (step 600) for processing. Selection of a respective row 604 of pixels may be facilitated by the presence of one or more fiducials 468 (e.g., bullseye fiducials).

A 1D Fourier transform operation (e.g., a 1D FFT) is performed (step 602) on the data within the row 604 of pixels (i.e., the spatial location and intensity data corresponding to the row 604 of pixels). The resulting 1D Fourier transform 470A is output at this step. As noted herein, the given image 454 and row 604 of pixels may be for a given gray-scale intensity or for a given color channel (e.g., red, green, or blue) in a multi-channel imaging context, and the corresponding 1D Fourier transform 470A may therefore relate to a given color or to an overall gray-scale image and the corresponding pattern of active/inactive sample wells for the respective excitation frequency.

Figure 22:
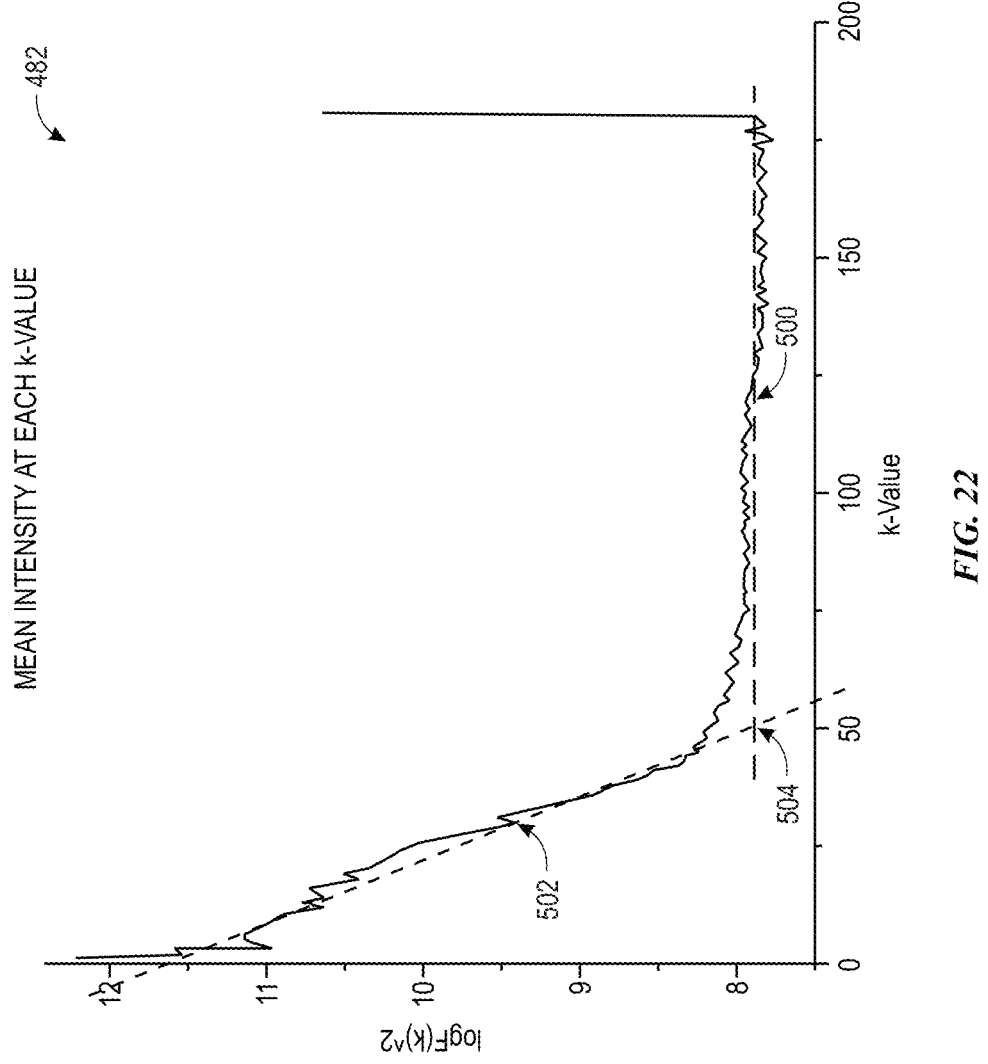
FIG. 22 visually illustrates a piecewise function fit to a power spectrum visually illustrates a Fourier transform derived from an image, in accordance with the present disclosure.

Turning back to FIG. 20, a power spectrum 482 in which integrated power is plotted for each k-value, and as shown in FIG. 22, may be calculated using the 1D Fourier transform 470A. In one embodiment, the power spectrum 482 may be derived (step 608) by performing a log square normalization of the 1D Fourier transform 470A for the row 604. The k-value average of the power spectrum is calculated (step 612). This allows the width of the associated point spread function (PSF) to be extracted or otherwise determined, as discussed herein, by fitting the power spectrum 482 of the log square normalization of the Fourier transform 470A as a function of k-value or k-value squared. As discussed herein, the mean (or median) k-value intensities provides a measure of how rapidly magnitude decreases with distance.

As discussed herein, and with further reference to FIG. 22, parameters of the power spectrum 482 are calculated, certain of which provide useful information, including a quantitative metric corresponding to focus quality as discussed herein. By way of example, and turning to FIG. 22, one or more of a k-value slope, corner frequency, and/or noise floor are derived using the power spectrum 482. By way of example, in one implementation, and as illustrated in FIG. 22, a piece-wise function (e.g., comprising two or more separately fit segments) may be fit to the power spectrum 482. Various metrics of the piece-wise function can then be determined that correspond to the noise floor, the k-value slope (e.g., the slope of the power spectrum in the region above the noise floor, the corner frequency, and so forth.

In certain embodiments the fitting of the piece-wise function is accomplished via generating (step 616) a least squares fit of the integrated power versus the k-space plot. Various implementations may improve hardware or firmware-based performance by limiting or specifying parameters of the fitting operation, such as by setting a fixed k-value range over which the linear fit is performed. By way of example, a lower limit (LL) of the k-value range may be 0, 10, 15, 20, 25, 30, and so forth. Conversely, an upper limit (UL) of the k-value range may be 50, 75, 100, 150, 200, and so forth). In this manner, in a hardware or firmware-based implementation, the calculation space may be limited so as to improve computational efficiency and performance. In some embodiments the linear fitting range may be allowed to vary within a specified tolerance (e.g., LL±10 or ±20 or UL LL±10 or ±20) so as to obtain useful focus metrics in a computationally efficient manner. As discussed elsewhere herein, the slope of the linear fit may be determined (step 620) and may be used as a focus metric that may in turn be used in parameterizing or generating a focus model for use during a scan operation. In certain implementations, a goodness-of-fit (i.e., $R^2$) of the fitted line may also be determined and used to determine whether a given fitted line (and corresponding focus quality metric) is retained or excluded from subsequent operations and calculations. By way of example, a goodness-of-fit measure above a certain threshold (e.g., 0.3, 0.5, 0.7, 0.9, and so forth) may be specified for a fitted line to be considered well fit and retained.

Figure 23:
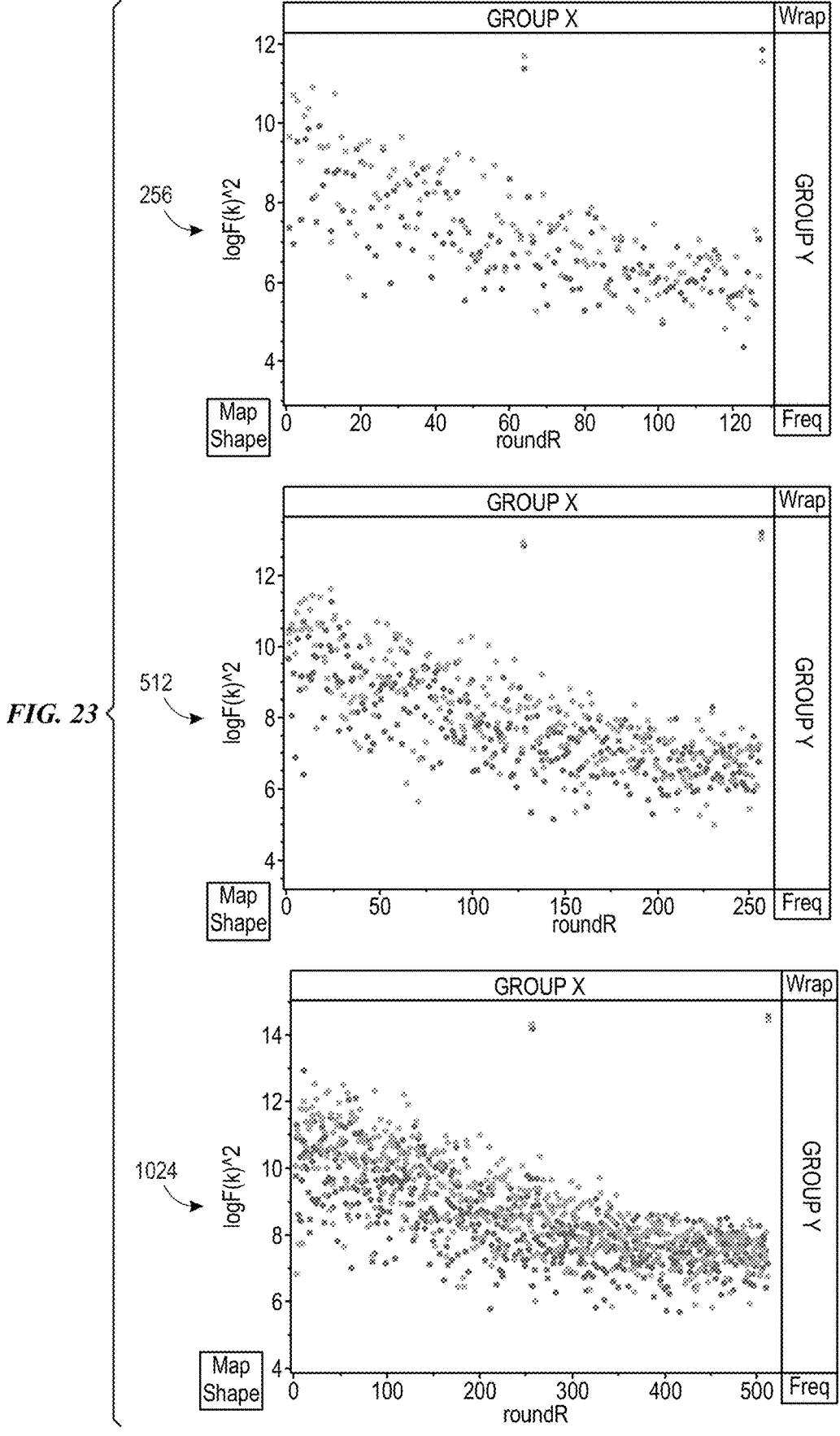
FIG. 23 visually illustrates plots of integrated power versus k-space value for varying row lengths and using a first averaging scheme, in accordance with the present disclosure.

In certain implementations, there may be benefits to averaging the power spectrum data prior to or subsequent to the fitting of the piece-wise function so as to improve the quality of the derived focus quality metric. By way of example, and turning to FIGS. 23 and 24, in each of these figures a plot of integrated power versus k-value for both blue (shown as open circles) and green (shown as solid circles) signals is illustrated with variations in length of the pixel row 604 and averaging of the Fourier transform signal so as to illustrate the effects of averaging both multiple rows and across images and the effects of row length. Turning to FIG. 23, three plots are illustrated that from left to right vary by length of the pixel row 604 being processed for focus quality metric generation. The leftmost plot is for a 256 pixel row, the middle plot of for a 512 pixel row, and the rightmost plot is for a 1,024 pixel row. K-value along the x-axis is, as might be expected, varied in the depicted plots as well, ranging from 0 to 130 in the leftmost plot, 0 to 250 in the middle plot, and 0 to 500 in the rightmost plot. As previously noted, the upper and lower limits of the k-values may be constrained for analysis and fitting purposes so as to facilitate implementations based on hardware or firmware where such constraints may improve computational efficiency. Each of the plots in FIG. 23 depict the integrated power versus k-value for an implementation averaging 1 row in 5 images. As may be discerned, data points and trends are more easily discerned as row length increases.

Figure 24:
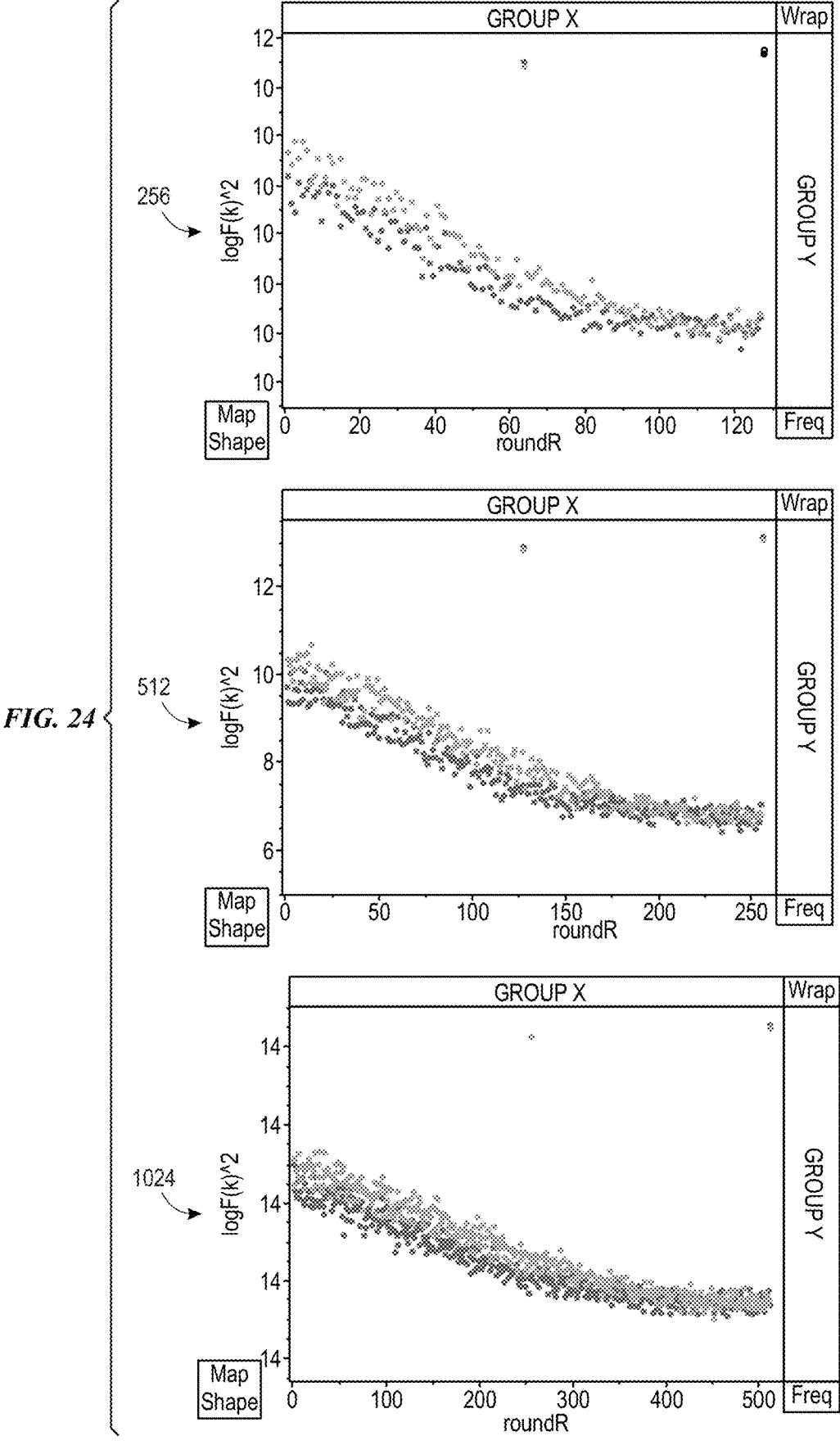
FIG. 24 visually illustrates plots of integrated power versus k-space value for varying row lengths and using a second averaging scheme, in accordance with the present disclosure.

Turning to FIG. 24, corresponding plots are depicted, however averaging is performed over 20 rows within each of the 5 images. As may be observed, averaging over multiple rows within each image decreases the spread of the data, thereby improving the signal quality. As observed in the preceding figure as well, increased the pixel row length also improves the signal quality, though the benefits may be less valuable from a computational standpoint past a certain row length. By way of example, for practical implementations, there may be little benefit to going beyond 512 pixels, although the data is still improved for longer row lengths.

Figure 25:
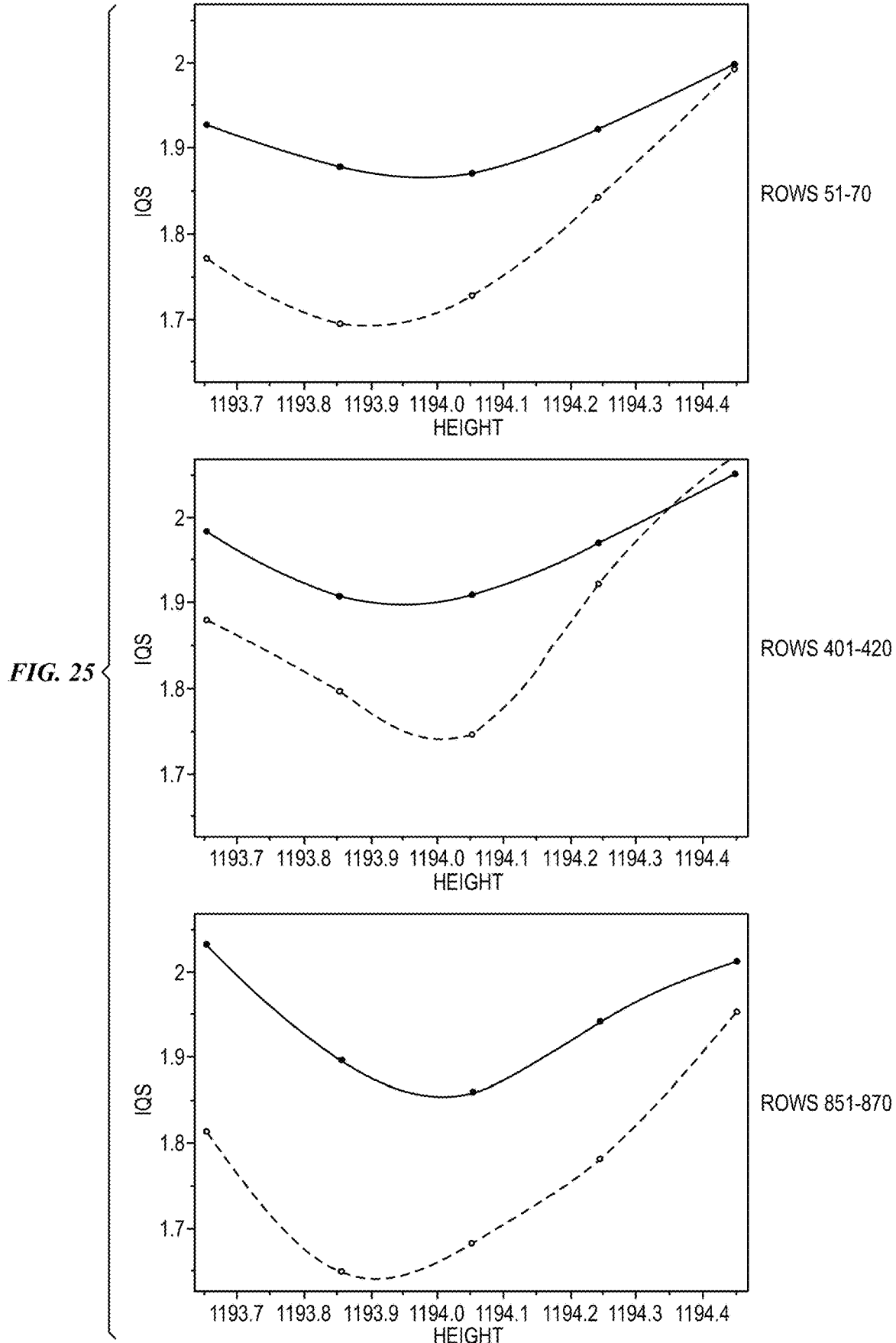
FIG. 25 visually illustrates plots depicting parabolic fitting of focus quality metrics versus focus depth to identify optimal focus depths, in accordance with the present disclosure.

As may be appreciated, in a real-world implementation, the value of the focus quality metric, corresponding to the slope of the fitted line in the piece-wise function as discussed herein, is used to generate a focus model that is then employed in a scan or sequencing operation to adjust focal distance or height as a flow cell is progressed through the scan. For practical purposes, this may correspond to providing a height in the z-dimension (depth or focus depth) that is changed or altered as different row are reached in the scan, either on a row-by-row basis or at incremental or periodic row checkpoints or milestones (e.g., every 10 row, 20 rows 50 row, 100 rows, 200, rows, 500 rows, and so forth). FIG. 25 illustrates graphically how this may be accomplished in certain implementations for both the blue and green fluorescence scans when imaged at different focus heights for each row of pixels used in the focus metric determination (i.e., using a stack of images acquired at different focus heights.

In the depicted example, the focus quality metric in the form of the slope of the fitted line of the piece-wise function as discussed herein is converted to an IQS score by multiplication by a factor suitable for converting the slope from Fourier space to pixels. This IQS value is plotted along the y-axis of the illustrated plots against height in the z-dimension (i.e., focus depth or depth) plotted along the x-axis of the plots. In these examples it may be observed that the plots of IQS score as a function of height in the z-dimension (as determined via processing images acquired at different focus depths) form generally parabolic plots. In these plots the observed minimum or lowest point corresponds to the optimal focus depth for the respective frequency.

Turning to FIG. 25 the IQS scores are calculated based on averages for 20 row increments and with line fitting to the piece-wise function performed with a lower limit of 25 and an upper limit of 200 k-values. As may be observed clear minima are observed for each color channel and each minimum corresponds to a focus depth along the x-axis that may optimally be used for that respective color channel for the respective rows for which the plot is generated. In practice, an optimal focus depth may be determined (for the respective set of rows) for each color channel or, alternatively, an acceptable focus depth or depths may be determined for all color channels or different subsets of the color channels based on their respective minima. That is, if the respective optimal focus depths for two or more color channels are within a given tolerance, a single, intermediary focus depth may be employed for imaging these color channels for the rows in question.

As described above and discussed herein, in practice it may be useful to implement the presently described techniques in firmware or hardware. In such implementations, and as discussed herein, it may be useful to apply constraint and/or to specify or otherwise set certain parameters so as to optimize such a hardware or firmware implementation. By of example, such parameters that may be specified or constrained in such an implementation include, but are not limited to: pixel row width (e.g., 128 pixels, 256 pixels, 512 pixels, 1,024 pixels, and so forth), lower limit (LL) of k-value (e.g., 0, 25, 50) for line fitting of the piece-wise function, upper limit (UL) of k-value (e.g., 75, 100, 150, 200, 250, 500) for line fitting of the piece-wise function, $R^2$ (i.e., goodness of fit) of the line fitting of the piece-wise function (e.g., 0.75, 0.8, 0.9); goodness of fit cutoff for the parabolic fit of the focus quality metric (or converted equivalent) with respect to focus height, number of rows (or row section) to be analyzed in a given image to get a parabolic fit (e.g., every row, alternate rows, and so forth), pitch between rows to analyze, and/or number of rows to average for each focus depth.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for determining a focus quality metric, comprising:

acquiring or accessing an image of a flow cell comprising a plurality of sample wells;

determining a Fourier transform of some or all of the image, wherein an optical point spread function (PSF) associated with the image does not have a Gaussian distribution profile;

determining a power spectrum based on the Fourier transform;

determining a slope of a linear segment fitted to a portion of the power spectrum, wherein the slope corresponds to the focus quality metric;

parameterizing or calibrating a focus model based on at least the focus quality metric, wherein the focus model is configured to monitor and adjust focus throughout a sequencing operation of the flow cell, wherein parameterizing or calibrating the focus model comprises determining an intermediate focus height based upon a difference between respective focus quality metrics derived for a first color channel and respective focus quality metrics derived for a second color channel; and adjusting the relative position of an objective lens and a sample stage on which the flow cell is positioned based upon the focus model during the sequencing operation.

2. The method of claim 1, wherein determining the Fourier transform comprises determining the Fourier transform of a sub-region of the image at a known location on the flow cell determined based on one or more fiducials provided on the flow cell.

3. The method of claim 1, wherein determining the power spectrum comprises:

determining mean or median k-value or radial intensities of the Fourier transform; and generating the power spectrum based on the mean or median k-value or radial intensities of the Fourier transform.

4. The method of claim 1, wherein the optical point spread function (PSF) associated with the image has a Lorentzian distribution profile.

5. The method of claim 1, wherein adjusting the relative position of the objective lens and the sample stage comprises selecting a focus height for the sequencing operation based on the focus model.

6. The method of claim 5, comprising:

imaging all or part of the flow cell using the focusing height during the sequencing operation.

7. The method of claim 1, wherein the focus quality metric is intensity independent.

8. A sequencing instrument, comprising:

a sample stage configured to support a sample container;

an objective lens, a photodetector, and a light source configured to operate in combination to image the sample container when present on the sample stage;

a focus component configured to control positioning of the objective lens relative to the sample container when present on the sample stage; and a controller configured to perform operations comprising:

for each image in a stack of images acquired of a sample surface at different z-heights, determining a respective Fourier transform for a sub-region of the respective image, wherein the stack of images comprises a first set of images acquired using a first color channel and a second set of images acquired using a second color channel;

for each Fourier transform, determining a respective slope of a linear segment fitted to a portion of a respective power spectrum calculated from the Fourier transform, wherein the slope corresponds to a focus quality metric;

parameterizing a focus model based upon the focus quality metrics; and controlling operation of the focus component during a sequencing operation based on the focus model.

9. The sequencing instrument of claim 8, wherein parameterizing the focus model comprises determining an intermediate focus height based upon difference between focus quality metrics derived for the first color channel and focus quality metrics derived for the second color channel.

10. The sequencing instrument of claim 9, wherein controlling operation of the focus component comprises acquiring image data during at least a portion of the sequencing operation at the intermediate focus height.

11. The sequencing instrument of claim 8, wherein the sample surface comprises a patterned surface of a flow cell.

12. The sequencing instrument of claim 10, wherein the focus quality metrics are intensity independent.

13. A method for determining a focus quality metric, comprising:

acquiring or accessing an image of a flow cell comprising a plurality of sample wells;

calculating a one-dimensional Fourier transform of one or more rows of pixels within the image;

determining a power spectrum based on the one-dimensional Fourier transform of each respective row of pixels;

determining a slope of a linear segment fitted to a portion of the power spectrum, wherein the slope corresponds to the focus quality metric;

parameterizing or calibrating a focus model based on at least the focus quality metric or a score derived from the focus quality metric by determining a focus height for a location in the focus model corresponding to the one or more rows of pixels by determining a local minimum for a plot of the focus quality metric or the score derived from the focus quality metric at the one or more rows of pixels; and adjusting the relative position of an objective lens and a sample stage on which the flow cell is positioned based upon the focus model.

14. The method of claim 13, wherein determining the power spectrum comprises:

performing a log square normalization of the one-dimensional Fourier transform.

15. The method of claim 13, wherein adjusting the relative position of the objective lens and the sample stage comprises selecting a focus height for a sequencing operation based on the focus model.

16. The method of claim 15, comprising:

imaging all or part of the flow cell using the focusing height during the sequencing operation.

17. The method of claim 13, wherein the plot of the focus quality metric used in determining the local minimum comprises a parabolic plot.

18. A sequencing instrument, comprising:

a sample stage configured to support a flow cell;

an objective lens, a photodetector, and a light source configured to operate in combination to image the flow cell when present on the sample stage;

a focus component configured to control positioning of the objective lens relative to the flow cell when present on the sample stage; and a controller configured to perform operations comprising:

for each image in a stack of images acquired of a sample surface at different z-heights, determining a respective one-dimensional Fourier transform for a row of pixels within the respective image;

for each one-dimensional Fourier transform, determining a respective slope of a linear segment fitted to a portion of a respective power spectrum calculated from the one-dimensional Fourier transform, wherein the slope corresponds to a focus quality metric;

parameterizing a focus model based upon the focus quality metrics by determining an intermediate focus height based upon difference between focus quality metrics derived for a first color channel and focus quality metrics derived for a second color channel; and controlling operation of the focus component during a sequencing operation based on the focus model.

19. The sequencing instrument of claim 18, wherein controlling operation of the focus component comprises acquiring image data during at least a portion of the sequencing operation at the intermediate focus height.

20. The sequencing instrument of claim 18, wherein each respective power spectrum is determined by performing a log square normalization of the one-dimensional Fourier transform.

21. The sequencing instrument of claim 18, wherein parameterizing the focus model comprises determining a focus height for a location in the focus model corresponding to the row of pixels by determining a local minimum for a parabolic plot of the focus quality metric or a score derived from the focus quality metric at the row of pixels.

22. The sequencing instrument of claim 18, wherein controlling operation of the focus component during the sequencing operation comprises adjusting the relative position of the objective lens and the sample stage by selecting a focus height for the sequencing operation based on the focus model.

23. The sequencing instrument of claim 22, wherein the controller is further configured to perform operations comprising:

imaging all or part of the flow cell using the focusing height during the sequencing operation.

\* \* \* \* \*